US012598634B2

(12) United States Patent
Ibrahim et al.

(10) Patent No.: US 12,598,634 B2
(45) Date of Patent: Apr. 7, 2026

(54) UPLINK CONFIGURED GRANT ADAPTION BASED ON INTERFERENCE MEASUREMENTS

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Yi Huang, San Diego, CA (US); Seyedkianoush Hosseini, San Diego, CA (US); Huilin Xu, Temecula, CA (US); Thomas Valerrian Pasca Santhappan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 744 days.

(21) Appl. No.: 17/929,123

(22) Filed: Sep. 1, 2022

(65) Prior Publication Data

US 2024/0080875 A1    Mar. 7, 2024

(51) Int. Cl.
| | |
|---|---|
| *H04W 72/542* | (2023.01) |
| *H04L 5/00* | (2006.01) |
| *H04L 5/14* | (2006.01) |
| *H04W 52/24* | (2009.01) |

(52) U.S. Cl.
CPC ......... *H04W 72/542* (2023.01); *H04L 5/0073* (2013.01); *H04L 5/1469* (2013.01); *H04W 52/243* (2013.01)

(58) Field of Classification Search
CPC .............. H04W 72/542; H04W 52/243; H04L 5/1469; H04L 5/0073
See application file for complete search history.

(56) References Cited

U.S. PATENT DOCUMENTS

| | | | | |
|---|---|---|---|---|
| 11,805,502 B2 * | 10/2023 | Abotabl | ................ | H04W 24/08 |
| 11,974,294 B2 * | 4/2024 | Hosseini | .......... | H04W 72/1268 |
| 12,356,392 B2 * | 7/2025 | Abotabl | ............... | H04J 11/0026 |
| 12,395,971 B2 * | 8/2025 | Xu | .................... | H04W 72/0446 |

(Continued)

FOREIGN PATENT DOCUMENTS

| | | | | | |
|---|---|---|---|---|---|
| CN | 106576302 A | * | 4/2017 | ........ | H04W 74/0833 |
| CN | 116998204 A | * | 11/2023 | .......... | H04W 72/541 |

*Primary Examiner* — Mounir Moutaouakil
(74) *Attorney, Agent, or Firm* — Harrity & Harrity LLP

(57) ABSTRACT

Wireless communications systems, apparatuses, and methods are provided. A method of wireless communication performed by a first user equipment (UE) includes receiving, from a network unit operating in full duplex mode, a configuration indicating scheduled uplink communication resources and interference level measurement resources, measuring, based on the interference level measurement resources, an interference level associated with a second UE, and performing, for a scheduled uplink communication, at least one of transmitting, based on the measured interference level associated with the second UE and based on the scheduled uplink communication resources, the scheduled uplink communication or refraining, based on the measured interference level associated with the second UE, from transmitting the scheduled uplink communication.

30 Claims, 10 Drawing Sheets

(56) References Cited

U.S. PATENT DOCUMENTS

| | | | |
|---|---|---|---|
| 2014/0036801 A1* | 2/2014 | Malladi | H04L 5/14 |
| | | | 370/328 |
| 2020/0304159 A1* | 9/2020 | Liao | H04J 11/0036 |
| 2020/0396633 A1* | 12/2020 | Tseng | H04W 24/10 |
| 2021/0036808 A1* | 2/2021 | Papasakellariou | |
| | | | H04W 52/0225 |
| 2024/0098657 A1* | 3/2024 | Wu | H04W 52/383 |
| 2024/0243888 A1* | 7/2024 | Ren | H04B 17/345 |
| 2025/0063412 A1* | 2/2025 | Tao | H04W 24/10 |

* cited by examiner

| Network Unit 105 | UE 115a | UE 115b |

First UL CG
Adaption
Configuration
602

SRS
604

Measure
SRS
606

Interference
Level Indicator
608

UL
Communication
610

DL
Communication
612

Second UL CG
Adaption
Configuration
614

SRS
616

Measure
SRS
618

Interference
Level Indicator
619

UL
Communication
620

DL
Communication
622

Figure 9:
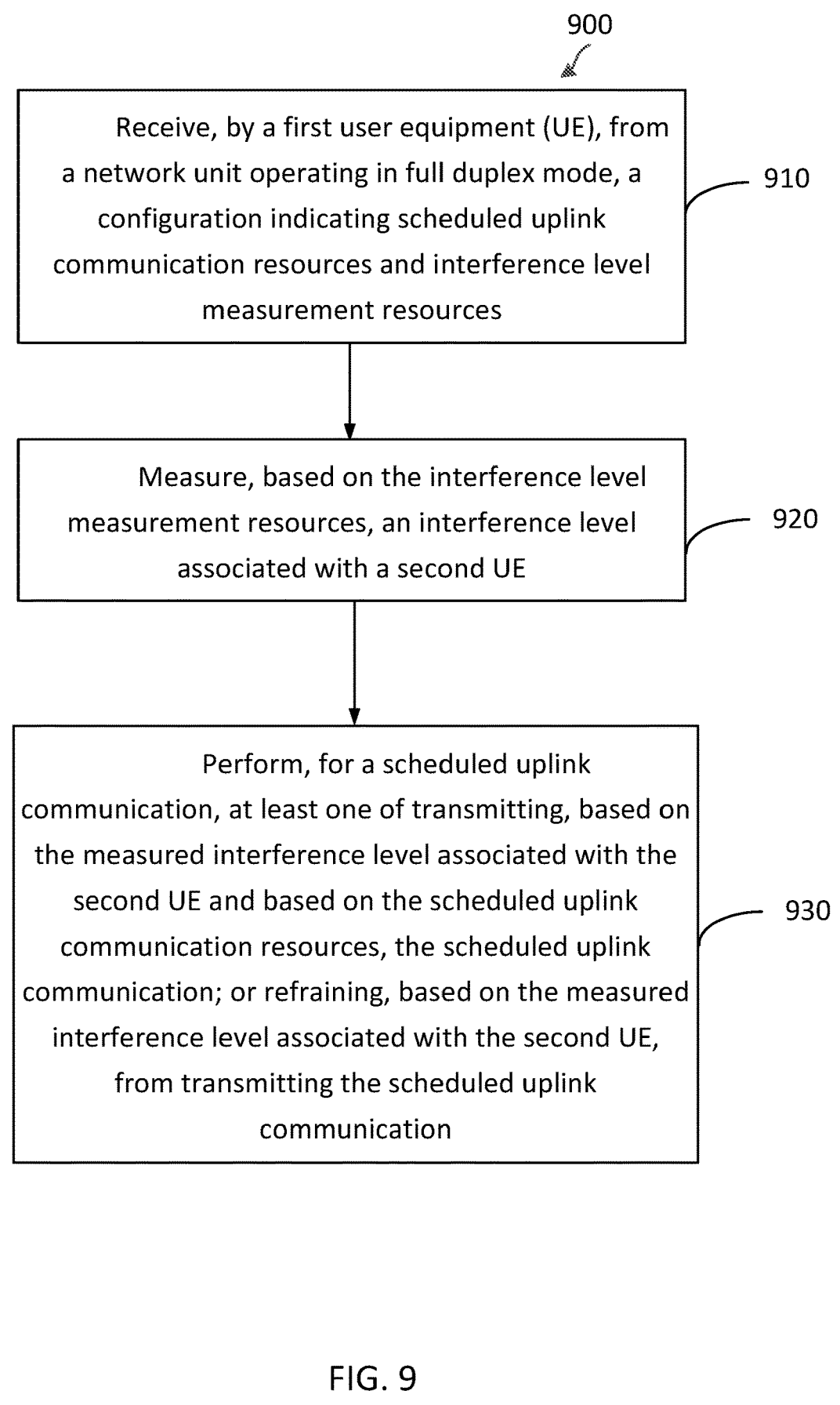

900

Receive, by a first user equipment (UE), from a network unit operating in full duplex mode, a configuration indicating scheduled uplink communication resources and interference level measurement resources — 910

Measure, based on the interference level measurement resources, an interference level associated with a second UE — 920

Perform, for a scheduled uplink communication, at least one of transmitting, based on the measured interference level associated with the second UE and based on the scheduled uplink communication resources, the scheduled uplink communication; or refraining, based on the measured interference level associated with the second UE, from transmitting the scheduled uplink communication — 930

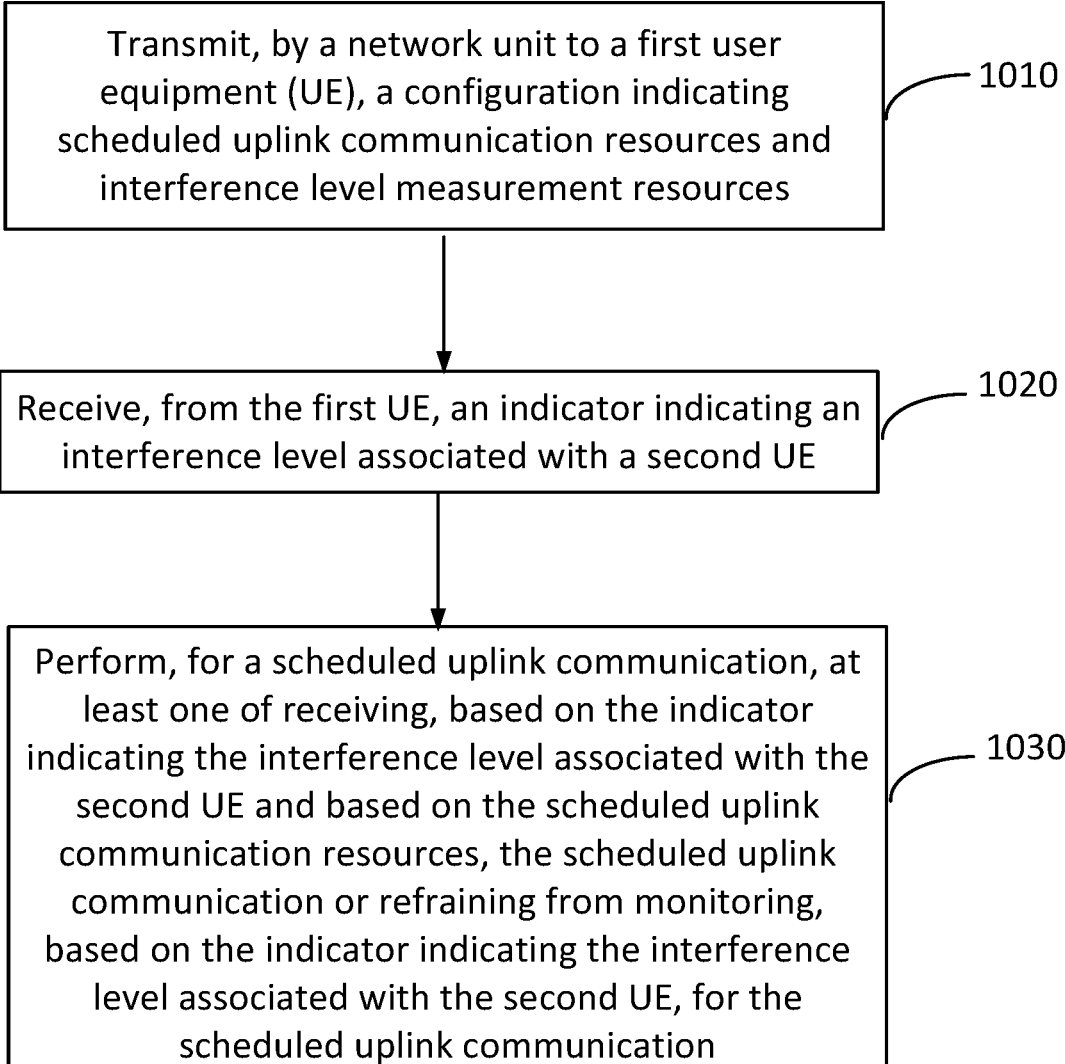

Transmit, by a network unit to a first user equipment (UE), a configuration indicating scheduled uplink communication resources and interference level measurement resources — 1010

Receive, from the first UE, an indicator indicating an interference level associated with a second UE — 1020

Perform, for a scheduled uplink communication, at least one of receiving, based on the indicator indicating the interference level associated with the second UE and based on the scheduled uplink communication resources, the scheduled uplink communication or refraining from monitoring, based on the indicator indicating the interference level associated with the second UE, for the scheduled uplink communication — 1030

FIG. 10

UPLINK CONFIGURED GRANT ADAPTION BASED ON INTERFERENCE MEASUREMENTS

TECHNICAL FIELD

This application relates to wireless communication systems, and more particularly, to uplink configured grant adaption based on interference measurements.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a first user equipment (UE) may include receiving, from a network unit operating in full duplex mode, a configuration indicating scheduled uplink communication resources and interference level measurement resources; measuring, based on the interference level measurement resources, an interference level associated with a second UE; and performing, for a scheduled uplink communication, at least one of: transmitting, based on the measured interference level associated with the second UE and based on the scheduled uplink communication resources, the scheduled uplink communication; or refraining, based on the measured interference level associated with the second UE, from transmitting the scheduled uplink communication.

In an additional aspect of the disclosure, a method of wireless communication performed by a network unit may include transmitting, to a first user equipment (UE), a configuration indicating scheduled uplink communication resources and interference level measurement resources; receiving, from the first UE, an indicator indicating an interference level associated with a second UE; performing, for a scheduled uplink communication, at least one of receiving, based on the indicator indicating the interference level associated with the second UE and based on the scheduled uplink communication resources, the scheduled uplink communication; or refraining from monitoring, based on the indicator indicating the interference level associated with the second UE, for the scheduled uplink communication.

In an additional aspect of the disclosure, a first user equipment (UE) may include a memory; a transceiver; and at least one processor coupled to the memory and the transceiver, wherein the first UE is configured to receive, from a network unit operating in full duplex mode, a configuration indicating scheduled uplink communication resources and interference level measurement resources; measure, based on the interference level measurement resources, an interference level associated with a second UE; and perform, for a scheduled uplink communication, at least one of transmitting, based on the measured interference level associated with the second UE and based on the scheduled uplink communication resources, the scheduled uplink communication or refraining, based on the measured interference level associated with the second UE, from transmitting the scheduled uplink communication.

In an additional aspect of the disclosure, a network unit may include a memory; a transceiver; and at least one processor coupled to the memory and the transceiver, wherein the network unit is configured to transmit, to a first user equipment (UE), a configuration indicating scheduled uplink communication resources and interference level measurement resources; receive, from the first UE, an indicator indicating an interference level associated with a second UE; perform, for a scheduled uplink communication, at least one of receiving, based on the indicator indicating the interference level associated with the second UE and based on the scheduled uplink communication resources, the scheduled uplink communication or refraining from monitoring, based on the indicator indicating the interference level associated with the second UE, for the scheduled uplink communication.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

BRIEF DESCRIPTION OF THE DRAWINGS

FIG. 5 illustrates an example of resources associated with full duplex and half duplex operations according to some aspects of the present disclosure.

FIG. 9 is a flow diagram of a communication method according to some aspects of the present disclosure.

FIG. 10 is a flow diagram of a communication method according to some aspects of the present disclosure.

DETAILED DESCRIPTION

Figure 1:
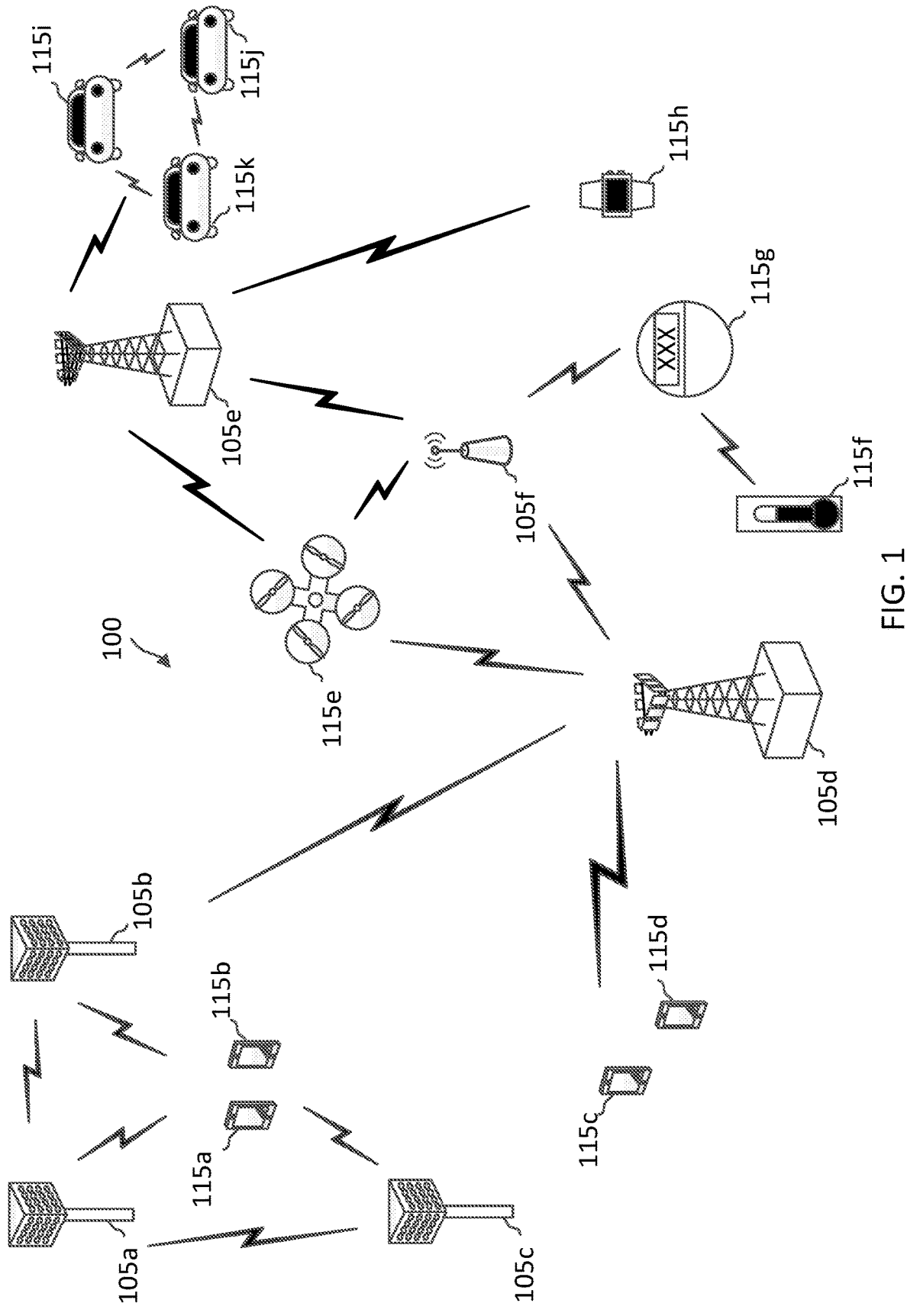
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA)

networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW).

For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNIT) radio band has a minimum OCB requirement of about at least 70 percent (%).

Some sidelink systems may operate over a 20 MHz bandwidth, e.g., for listen before talk (LBT) based channel accessing, in an unlicensed band. ABS may configure a sidelink resource pool over one or multiple 20 MHz LBT sub-bands for sidelink communications. A sidelink resource pool is typically allocated with multiple frequency subchannels within a sidelink band width part (SL-BWP) and a sidelink UE may select a sidelink resource (e.g., one or multiple subchannels in frequency and one or multiple slots in time) from the sidelink resource pool for sidelink communication.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

ABS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. ABS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a vehicle (e.g., a car, a truck, a bus, an autonomous vehicle, an aircraft, a boat, etc.). Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. In some aspects, the UE 115*h* may harvest energy from an ambient environment associated with the UE 115*h*. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL)

transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, integrated access and backhaul (IAB) node, a relay node, a sidelink node, etc.

In some aspects, the UE 115a may receive a configuration from the BS 105 operating in full duplex mode indicating scheduled uplink communication resources and interference level measurement resources. The UE 115a may measure, based on the interference level measurement resources, an interference level associated with UE 115*b*. The UE 115*a* may perform, for a scheduled uplink communication, at least one of transmitting, based on the measured interference level associated with the UE 115*b* and based on the scheduled uplink communication resources, the scheduled uplink communication or the UE 115*a* may refrain, based on the measured interference level associated with the UE 115*b*, from transmitting the scheduled uplink communication.

Figure 2:
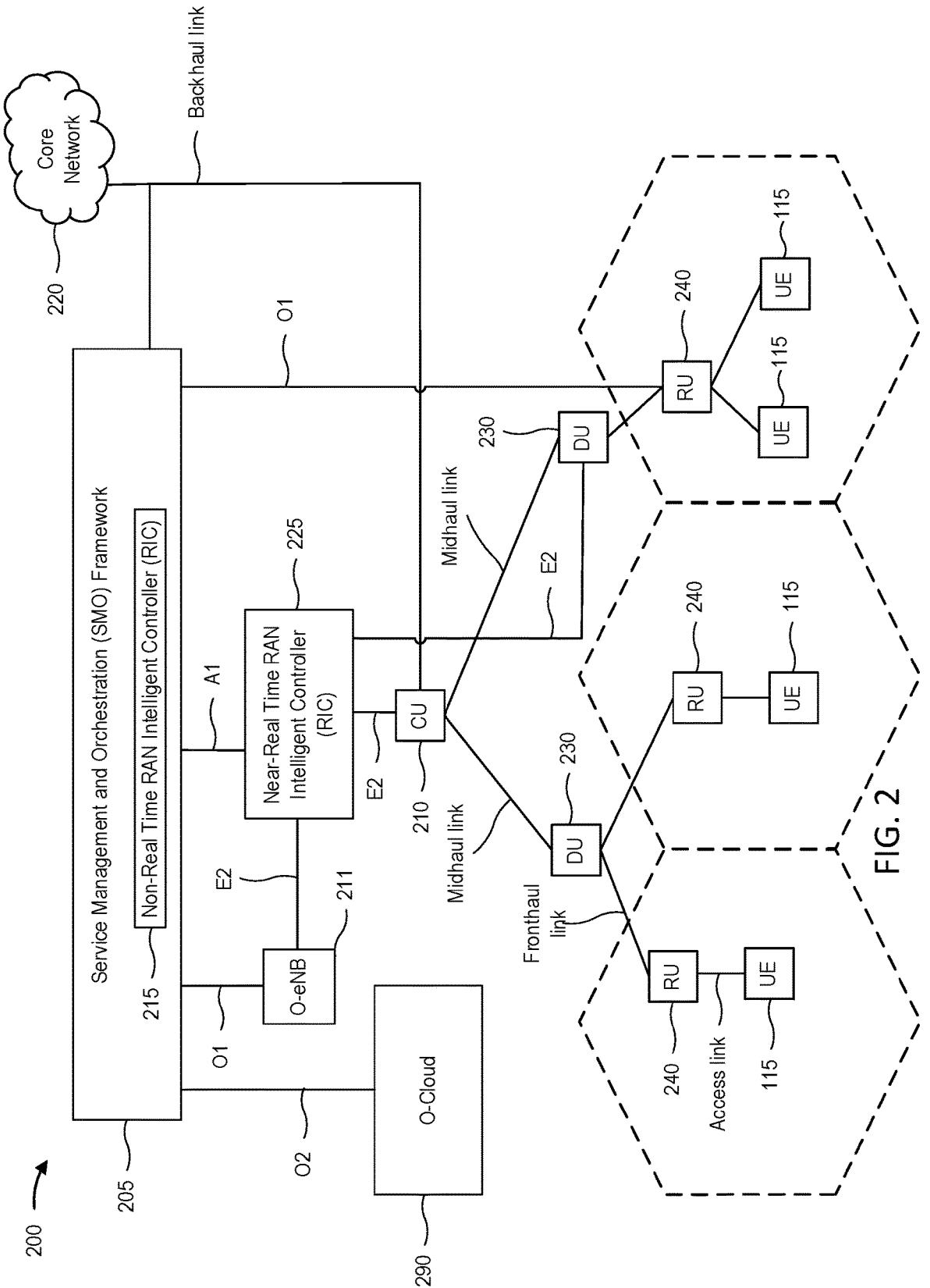
FIG. 2 illustrates an example disaggregated base station architecture according to some aspects of the present disclosure

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 115 via one or more radio frequency (RF) access links. In some implementations, the UE 115 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 115. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
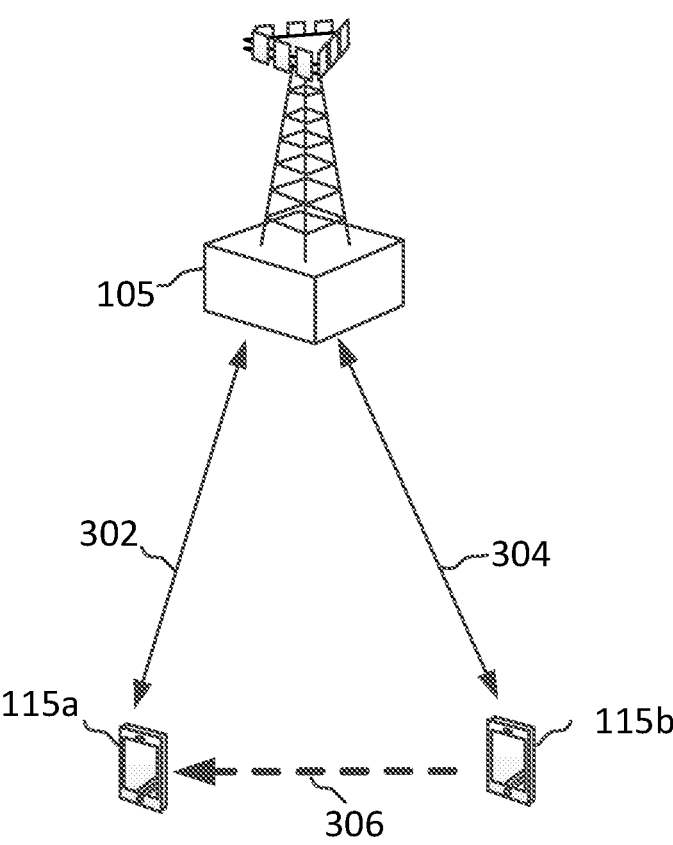
FIG. 3 illustrates a wireless communication network according to some aspects of the present disclosure.

In some aspects, the UE 115a may receive a configuration from the network unit 105 operating in full duplex mode indicating scheduled uplink communication resources and interference level measurement resources. The UE 115a may measure, based on the interference level measurement resources, an interference level associated with UE 115b. The UE 115a may perform, for a scheduled uplink communication, at least one of transmitting, based on the measured interference level associated with the UE 115b and based on the scheduled uplink communication resources, the scheduled uplink communication or the UE 115a may refrain, based on the measured interference level associated with the UE 115b, from transmitting the scheduled uplink communication, FIG. 3 illustrates a wireless communication network according to some aspects of the present disclosure. In FIG. 3, the network unit 105 may operate in full duplex mode and/or half duplex mode. The UE 115a may receive a configuration from the network unit 105 (e.g., the BS 105, the RU 240, the DU 230, the CU 210, and/or the network unit 800). The configuration may indicate scheduled uplink communication resources and interference level measurement resources. In this regard, the UE 115a may receive the configuration including the scheduled uplink communication resources and/or the interference level measurement resources via a radio resource control (RRC) message, downlink control information (DCI), a medium access control-control element (MAC-CE) message, a PDSCH communication, and/or a PDCCH communication. In some aspects, the configuration may include a field indicating an association between the scheduled uplink communication resources and the interference level measurement resources. The scheduled uplink communication resources may be indicated as a configured grant (CG). The CG may indicate time/frequency resources that are scheduled for the first UE to transmit communication(s) to the network unit 105 over communication link 302. In some aspects, the interference level measurement resources may indicate time/frequency resources in which the UE 115a may measure (e.g., sense) interference level(s) from the UE 115b and/or other UEs.

In some aspects, the UE 115a may measure an interference level associated with the UE 115b. The UE 115a may measure the interference level based on the interference level measurement resources indicated in the configuration received from the network unit 105. The UE 115b may transmit a reference signal (e.g., a sounding reference signal (SRS) or other suitable reference signal) to the UE 115a over the link 306 using the interference level measurement resources. The UE 115a may measure the interference level associated with the SRS in the interference level measurement resources. For example, the UE 115a may measure a received signal strength indicator (RSSI) associated with the SRS, a reference signal received power (RSRP), and/or other measurement parameter associated with the SRS.

In some aspects, the channel between the UE 115a and the UE 115b may exhibit reciprocity. In this regard, a measurement of a signal transmitted by the UE 115b to the UE 115a over link 306 may indicate how a signal transmitted by the UE 115a may be received by the UE 115b. For example, the UE 115a may measure the SRS from the UE 115b to determine how a transmission by the UE 115a may cause interference to the UE 115b. For example, an uplink transmission by the UE 115a to the network unit 105 over communication link 302 may cause interference to the UE 115b when the UE 115b is receiving a downlink transmission from the network unit 105 over link 304. In some aspects, the UE 115a may evaluate the amount of interference caused to the UE 115b by an uplink transmission of the UE 115a by comparing the measured interference level (e.g., the RSSI and/or RSRP of the SRS) to one or more interference level thresholds. In some aspects, the configuration may indicate the interference level threshold(s). The UE 115a may determine that the interference caused by the UE 115a satisfies the threshold based on the interference level measurement (e.g., the RSSI, RSRP, and/or other measurement of the SRS) being greater than or equal to (or just greater than in some instances) the interference level threshold. The UE 115a may determine that the interference level does not satisfy the threshold based on the interference level measurement being less than or equal to (or just less than in some instances) the interference level threshold.

In some aspects, the UE 115a may transmit a scheduled uplink communication to the network unit 105 over communication link 302 based on the measured interference level associated with the UE 115b and based on the scheduled uplink communication resources. In some aspects, the UE 115a may refrain from transmitting the scheduled uplink communication based on the measured interference level associated with the UE 115b. In this regard, the UE 115a may transmit or refrain from transmitting the scheduled uplink communication based on whether the measured interference level satisfies the interference level threshold. For example, if the interference level is less than the interference level threshold, then the UE 115a may transmit the scheduled uplink communication. If the interference level is greater than or equal to or equal to (or just greater than in some instances) the interference level threshold, then the UE 115a may refrain from transmitting the scheduled uplink communication and/or transmit the scheduled uplink communication with one or more modified parameters (e.g., modified power transmission level, modified transmission beam, etc.). The UE 115a may refrain from transmitting the scheduled uplink communication and/or transmit the scheduled uplink communication with the modified parameter(s) in order to reduce potential interference with the downlink communication from the network unit 105 to the UE 115b.

Figures 4A, 4B, 4C:
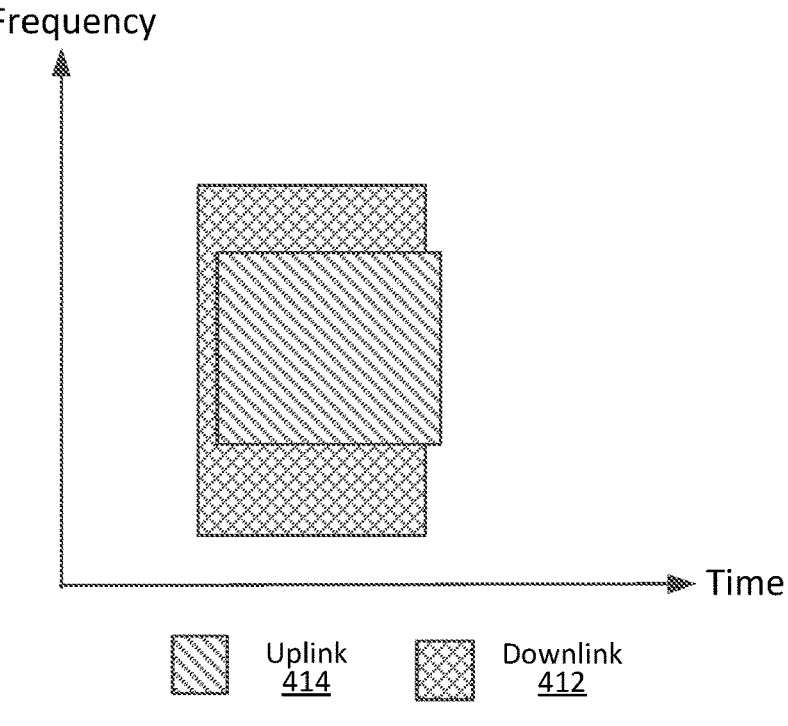
FIGS. 4A-4C illustrate uplink and downlink frequency resources according to some aspects of the present disclosure.

FIGS. 4A-4C illustrate overlapping and non-overlapping uplink and downlink frequency resources according to some aspects of the present disclosure. In FIGS. 4A-4C, the x-axis represents time in some arbitrary units and the Y axis represents frequency in some arbitrary units. In some aspects, interference between the UE 115a and the UE 115b, as described with reference to FIG. 3, may be based on an amount of overlap (e.g., no overlap, complete overlap, and/or partial overlap) of uplink 414 and downlink 412 frequency bands. For example, when the UE 115a and the UE 115b communicate with a network unit 105 in full duplex mode using non-overlapping, partially overlapping, and/or fully overlapping uplink 414 and downlink 412 frequency bands, an uplink communication (e.g., a CG transmission) by the UE 115a may interfere with a downlink communication (e.g., semi-persistent scheduling transmission by a network unit 105) to the UE 115b. The configuration received by the UE 115*a* from the network unit 105 may indicate to the UE 115*a* if the scheduled uplink transmission is in an overlapping frequency band with a downlink transmission to the UE 115*b*. For example, the configuration may indicate that the uplink 414 frequency band may partially overlap the downlink 412 frequency band as shown in FIG. 4A. In some aspects, the configuration may indicate that the uplink 414 frequency band may completely overlap the downlink 412 frequency band as shown in FIG. 4B. In some aspects, the configuration may indicate that the uplink 414 frequency band may have no overlap with the downlink 412 frequency band and may be separated by a guard band as shown in FIG. 4C. The configuration received by the UE 115*a* from the network unit 105 may further indicate to the UE 115*a* if the scheduled uplink transmission is in an overlapping time period (e.g., same slot and/or sublot) as the downlink transmission to the UE 115*b*.

Figure 5:
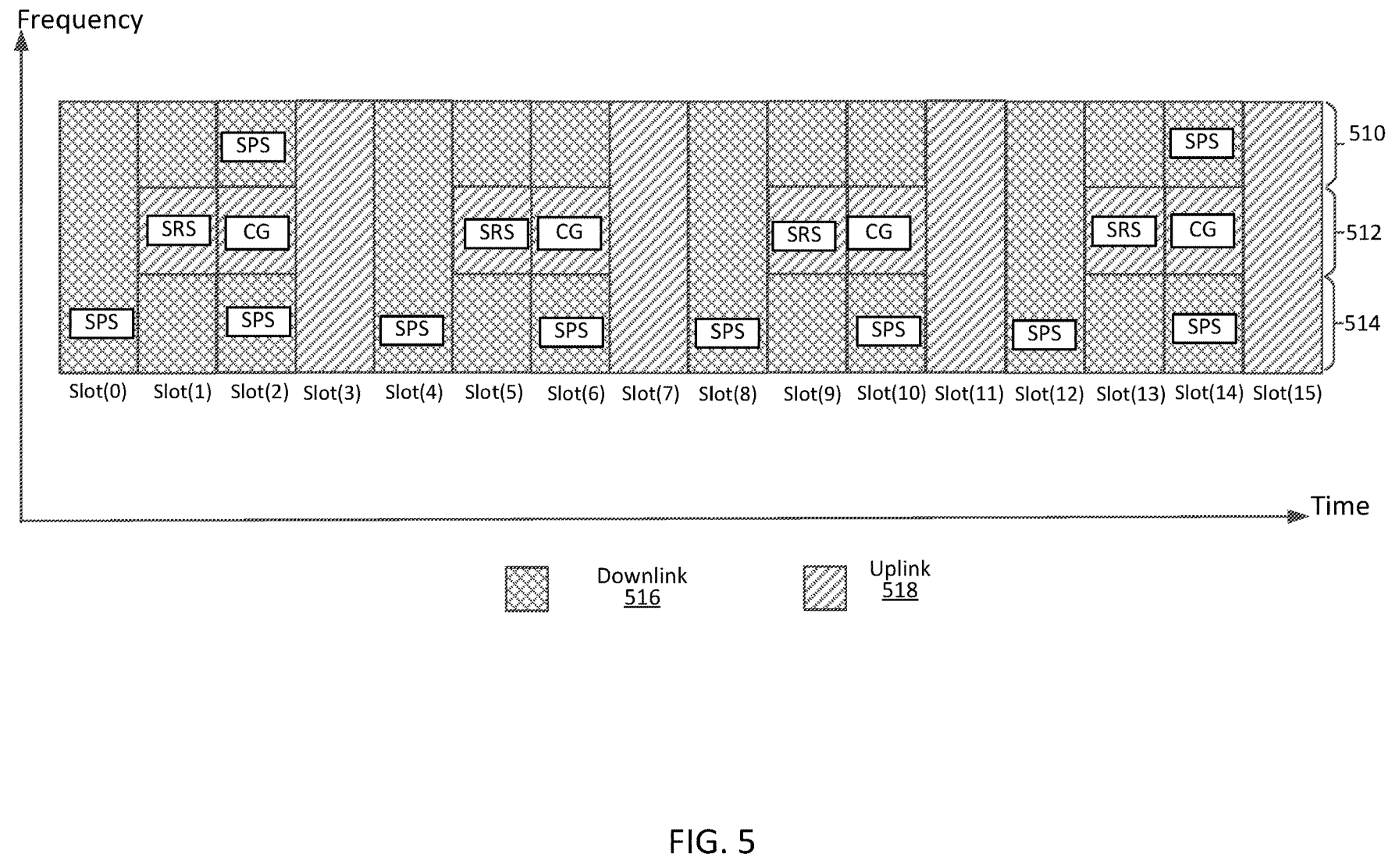

FIG. 5 illustrates an example of resources associated with full duplex and half duplex operations according to some aspects of the present disclosure. In FIG. 5, the x-axis represents time in some arbitrary units and the Y axis represents frequency in some arbitrary units. In some aspects, a first UE may transmit a scheduled uplink communication or refrain from transmitting the scheduled uplink communication based on a duplex mode associated with the network unit and interference level measurements. In some aspects, the network unit may configure certain time periods (e.g., slots, sub-slots, frames, etc.) as half duplex and other time periods as full duplex. For example, as shown in FIG. 5, slots 0, 4, 8, and 12 may be configured as downlink 516 slots. Slots 3, 7, 11, and 15 may be configured as uplink 518 slots. Slots 1, 2, 5, 6, 9, 10, 13, and 14 may be configured for full duplex operation and include both uplink 518 and downlink 516. The first UE may transmit the scheduled uplink communication as scheduled when the network unit is operating in half duplex mode. For example, the first UE may transmit the scheduled uplink communication when slots 3, 7, 11, and 15 associated with the scheduled uplink communication are configured as uplink 518 slots. When slots 1, 2, 5, 6, 9, 10, 13, and 14 associated with the scheduled uplink communication are configured for full duplex as an uplink 518/downlink 516 slot, the first UE may transmit the scheduled uplink communication when the measured interference level is less than or equal to (or just less than in some instances) the interference level threshold. When slots 1, 2, 5, 6, 9, 10, 13, and 14 associated with the scheduled uplink communication are configured for full duplex as an uplink 518/downlink 516 slot, the first UE may refrain from transmitting the scheduled uplink communication when the measured interference level is greater than or equal to (or just greater than in some instances) the interference level threshold.

In some aspects, the first UE may transmit the scheduled uplink communication or refrain from transmitting the scheduled uplink communication based on an amount of overlap of the scheduled uplink communication and a scheduled downlink communication from the network unit to the second UE. The first UE may receive a configuration from the network unit indicating which slots have an overlap between the scheduled uplink communication and a downlink communication to the second UE. The configuration may indicate which slots have an overlap between the scheduled uplink communications and downlink communications to other UEs that may potentially be affected by interference from the first UE. In the example of FIG. 5, the first UE may be scheduled via a configured grant to transmit to the network unit in frequency band 512 during slots 2, 6, 10, and 14. The second UE may be scheduled via semi-persistent scheduling to receive a communication from the network unit in frequency band 514 during slots 0, 2, 4, 6, 8, 10, 12, and 14. A third UE may be scheduled via semi-persistent scheduling to receive a communication from the network unit in frequency band 510 during slots 2 and 14. The configuration may include a bitmap indicating overlapping slots of the scheduled uplink communication and the scheduled downlink communication(s) from the network unit to the second UE (e.g., slots 0, 2, 4, 6, 8, 10, 12, and 14) and/or the third UE (e.g., slots 2 and 14). Additionally or alternatively, the configuration may indicate a periodicity (e.g., a number of slots, number of ms, or otherwise) and an offset (e.g., an offset from the beginning of a frame and/or subframe, an offset relative to a reference time, or otherwise) indicating overlapping slots of the scheduled uplink communication and the scheduled downlink communication(s). In some aspects, the first UE may receive an initial configuration via RRC indicating the overlap and periodically receive an update to the configuration. For example, the first UE may receive an update to the configuration every x subframes via a MAC-CE message, DCI, or other suitable communication. The first UE may transmit the scheduled uplink communication when there is no overlap between the scheduled uplink communication and the downlink communication. The first UE may also transmit the scheduled uplink communication when there is overlap, but the measured interference level is less than or equal to (or just less than in some instances) the interference level threshold. The first UE may refrain from transmitting the scheduled uplink communication when there is overlap and the measured interference level is greater than or equal to (or just greater than in some instances) the interference level threshold. For example, the second UE and/or the third UE may transmit an SRS in frequency band 512 during slots 1 and 13 based on the CG of the first UE overlapping with the SPS of the second and third UEs in slots 2 and 14. The first UE may measure the SRS and determine whether to transmit in slots 2 and 14 based on the measured SRS in slots 1 and 13 respectively. As another example, the second UE may transmit an SRS in frequency band 512 during slots 5 and 9 based on the CG of the first UE overlapping with the SPS of the second UE in slots 6 and 10. The first UE may measure the SRS and determine whether to transmit in slots 6 and 10 based on the measured SRS in slots 5 and 9 respectively.

In some aspects, the first UE may transmit the scheduled uplink communication or refrain from transmitting the scheduled uplink communication based on a comparison of priority levels associated with the scheduled uplink communication and the scheduled downlink communication. The first UE may receive a configuration from the network unit indicating a priority level associated with the scheduled downlink communication to the second UE. The first UE may transmit the scheduled uplink communication when the priority level of the scheduled uplink communication is greater than or equal to (or just greater than in some instances) the priority level associated with the downlink communication. The first UE may transmit the scheduled uplink communication when the priority level of the scheduled uplink communication is greater than or equal to (or just greater than in some instances) the priority level associated with the downlink communication and the measured interference level is less than or equal to (or just less than in some instances) the interference level threshold. The first UE may refrain from transmitting the scheduled uplink communication when the priority level of the scheduled uplink communication is less than or equal to (or just less than in some instances) the priority level associated with the downlink communication and the measured interference level is greater than or equal to (or just greater than in some instances) the interference level threshold.

In some aspects, the first UE may transmit the scheduled uplink communication or refrain from transmitting the scheduled uplink communication based on a frequency separation between a frequency band associated with the scheduled uplink communication and a frequency band associated with the scheduled downlink communication. The first UE may receive a configuration from the network unit indicating the frequency separation between the frequency bands 512 associated with the scheduled uplink communication and the frequency bands 510 and 514 associated with the scheduled downlink communication(s). The frequency separation may be indicated as a number of subchannels, a frequency range, a frequency band, or other suitable frequency separation indicator. If the frequency separation is large enough, the scheduled uplink communication may not cause interference over the interference level threshold to the downlink communication. The first UE may transmit the scheduled uplink communication when the frequency separation between the frequency band associated with the scheduled uplink communication and the frequency band associated with the scheduled downlink communication is greater than or equal to (or just greater than in some instances) a frequency separation threshold. The first UE may transmit the scheduled uplink communication when the frequency separation between the frequency band associated with the scheduled uplink communication and the frequency band associated with the scheduled downlink communication is greater than or equal to (or just greater than in some instances) the frequency separation threshold and the measured interference level is less than or equal to (or just less than in some instances) the interference level threshold. The first UE may refrain from transmitting the scheduled uplink communication when the frequency separation between the frequency band associated with the scheduled uplink communication and the frequency band associated with the scheduled downlink communication is less than or equal to (or just less than in some instances) the frequency separation threshold and the measured interference level is greater than or equal to (or just greater than in some instances) the interference level threshold.

In some aspects, the first UE may transmit the scheduled uplink communication or refrain from transmitting the scheduled uplink communication based on a repetition associated with the scheduled uplink communication. The first UE may receive a configuration from the network unit indicating whether the first UE is configured to repeat the scheduled uplink transmission (e.g., repeat the scheduled uplink transmission in contiguous slots). The configuration may indicate no repetition of the scheduled uplink transmission and/or repetition (e.g., a number of repetitions) of the scheduled uplink communication. If the scheduled uplink transmission is repeated, the probability of a successful decoding of the scheduled uplink communication by the network unit is increased as compared to no repetitions. The first UE may transmit the scheduled uplink communication when no repetitions of the scheduled uplink communication are configured and the measured interference level is greater than or equal to (or just greater than in some instances) the interference level threshold. The first UE may refrain from transmitting the scheduled uplink communication when repetitions of the scheduled uplink communication are configured and the measured interference level is greater than or equal to (or just greater than in some instances) the interference level threshold.

In some aspects, the first UE may transmit the scheduled uplink communication or refrain from transmitting the scheduled uplink communication based on a repetition associated with the scheduled downlink communication to the second UE. The first UE may receive a configuration from the network unit indicating whether the network unit is configured to repeat the scheduled downlink transmission (e.g., repeat the scheduled downlink transmission in contiguous slots). The configuration may indicate no repetition of the scheduled downlink transmission and/or repetition (e.g., a number of repetitions) of the scheduled downlink communication. If the scheduled downlink transmission is repeated, the probability of a successful decoding of the scheduled downlink communication by the second UE is increased as compared to no repetitions. The first UE may transmit the scheduled uplink communication when repetitions of the scheduled downlink communication are configured and the measured interference level is greater than or equal to (or just greater than in some instances) the interference level threshold. The first UE may refrain from transmitting the scheduled uplink communication when no repetitions of the scheduled downlink communication are configured and the measured interference level is greater than or equal to (or just greater than in some instances) the interference level threshold.

In some aspects, the scheduled uplink communication may be scheduled to be repeated over multiple contiguous slots. The first UE may refrain from transmitting the scheduled uplink communication in all of the multiple contiguous slots when the measured interference level is greater than or equal to (or just greater than in some instances) the interference level threshold. Additionally or alternatively, the first UE may refrain from transmitting the scheduled uplink communication in certain slots of the multiple contiguous slots. For example, the first UE may transmit the first scheduled uplink transmission and refrain from transmitting one or more of the repeated uplink communications when the measured interference level is greater than or equal to (or just greater than in some instances) the interference level threshold. The first UE may refrain from transmitting one or more of the repeated uplink communications based on a redundancy version of the repeated uplink communications when the measured interference level is greater than or equal to (or just greater than in some instances) the interference level threshold. For example, the first UE may refrain from transmitting the repeated uplink communications when the repeated uplink communication has a redundancy version other than RV0. In some aspects, the scheduled uplink communication may include a transport block scheduled over multiple contiguous slots.

If the measured interference level associated with one or more of the multiple contiguous slots is greater than or equal to (or just greater than in some instances) the interference level threshold, the first UE may refrain from transmitting the TB over the multiple contiguous slots and/or the first UE may transmit the TB over the multiple contiguous slots. For example, the first UE may transmit the first scheduled TB over the multiple contiguous slots and refrain from transmitting one or more of the repeated TB over the multiple contiguous slots when the measured interference level is greater than or equal to (or just greater than in some instances) the interference level threshold. In some aspects, the first UE may refrain from transmitting the scheduled TB over the multiple contiguous slots when the TB has a redundancy version other than RV0. In some aspects, the first UE may refrain from transmitting the TB over multiple contiguous slots when a threshold number of the slots of the multiple contiguous slots has a measured interference level greater than or equal to (or just greater than in some instances) the interference level threshold.

Figure 6:
FIG. 6 is a signaling diagram of a wireless communication method according to some aspects of the present disclosure.

FIG. 6 is a signaling diagram of a wireless communication method 600 according to some aspects of the present disclosure. Actions of the communication method 600 can be executed by a computing device (e.g., a processor, processing circuit, and/or other suitable component) of a communication device or other suitable means for performing the actions. For example, a wireless communication device, such as the UE 115 or UE 700, may utilize one or more components, such as the processor 702, the memory 904, the configured grant adaption module 708, the transceiver 710, the modem 712, and the one or more antennas 716, to execute aspects of method 600. A wireless communication device, such as the network unit 105 or 800, may utilize one or more components, such as the processor 802, the memory 804, the configured grant adaption module 808, the transceiver 810, the modem 812, and the one or more antennas 816, to execute aspects of method 600.

At action 602, the network unit 105 may transmit a configuration to the UE 115*a*. The configuration may indicate scheduled uplink communication resources and interference level measurement resources. In this regard, the UE 115*a* may receive the configuration including the scheduled uplink communication resources and/or the interference level measurement resources via a radio resource control (RRC) message, downlink control information (DCI), a medium access control-control element (MAC-CE) message, a PDSCH communication, and/or a PDCCH communication. In some aspects, the configuration may include a field indicating an association between the scheduled uplink communication resources and the interference level measurement resources. The scheduled uplink communication resources may be indicated as a configured grant (CG). The CG may indicate time/frequency resources that are scheduled for the UE 115*a* to transmit communication(s) to the network unit 105. In some aspects, the interference level measurement resources may indicate time/frequency resources in which the UE 115*a* may measure (e.g., sense) interference level(s) from the UE 115*b* and/or other UEs.

At action 604, the UE 115*b* may transmit a reference signal (e.g., an SRS) to the UE 115*a*. In this regard, the UE 115*b* may transmit the SRS in the interference level measurement resources indicated in the configuration transmitted to the UE 115*a* at action 602.

At action 606, the UE 115*a* may measure the SRS transmitted by the UE 115*b* at action 604. The UE 115*a* may measure the interference level associated with the SRS in the interference level measurement resources indicated in the configuration transmitted to the UE 115*a* at action 602. For example, the UE 115*a* may measure a received signal strength indicator (RSSI) associated with the SRS, a reference signal received power (RSRP), and/or other measurement parameter associated with the SRS. In some aspects, the channel between the UE 115*a* and the UE 115*b* may exhibit reciprocity. In this regard, a measurement of a signal transmitted by the UE 115*b* to the UE 115*a* may indicate how a signal transmitted by the UE 115*a* may be received by the UE 115*b*. For example, the UE 115*a* may measure the SRS from the UE 115*b* to determine how a transmission by the UE 115*a* may cause interference to the UE 115*b*. In some aspects, the UE 115*a* may evaluate the amount of interference caused to the UE 115 by a transmission of the UE 115*a* by comparing the measured interference level (e.g., the RSSI and/or RSRP of the SRS) to one or more interference level thresholds.

In some aspects, the interference level threshold may be based on parameters associated with one or more downlink communications. For example, the network unit 105 may determine the interference level threshold based on the parameters associated with semi-persistent scheduled downlink communications to the UE 115*b*. In some aspects, the network unit may configure the same interference level threshold for each UE (or group of UEs) scheduled for downlink communications or a different interference level threshold for each of the UEs (or group of UEs) scheduled for downlink communications. The network unit 105 may determine the interference level threshold(s) based on the parameters associated with the scheduled downlink communications to the UE 115*b* and/or other UEs. For example, the interference level threshold may be based on a modulation and coding scheme (MCS) associated with the downlink communications, time/frequency resources associated with the downlink communications, an overlap between the downlink communication frequency band and the uplink communication frequency band, a guard band between the downlink communication frequency band and the uplink communication frequency band, and/or other suitable communication parameters.

At action 608, the UE 115*a* may transmit (e.g., report) the interference level indicator to the network unit 105. In some aspects, the UE 115*a* may report the interference level associated with the UE 115*b* to the network unit 105. In this regard, the UE 115*a* may transmit an indicator indicating the interference level via a channel state information (CSI) report, a layer 3 control message, uplink control information (UCI), a medium access control-control element (MAC-CE) message, a PUSCH communication, and/or a PUCCH communication. The UE 115*a* may transmit the indicator indicating the interference level on a periodic basis and/or an aperiodic basis. The UE 115*a* may transmit the indicator indicating the interference level to the network unit based on the periodicity associated with the CG. In some aspects, the UE 115*a* may report the interference level associated with the UE 115*b* as a code point. For example, a single code point (e.g., 0 or 1) may indicate whether the interference level satisfies the threshold (e.g., 1) or does not satisfy the threshold (e.g., 0). In some aspects, the configuration may include multiple thresholds. Multiple code points may indicate which, if any, of the interference levels are satisfied.

At action 610, the UE 115*a* may transmit or refrain from transmitting the scheduled uplink communication based on whether the measured interference level satisfies the interference level threshold. For example, if the interference level is less than the interference level threshold, then the UE 115*a* may transmit the scheduled uplink communication. If the interference level is greater than or equal to or equal to (or just greater than in some instances) the interference level threshold, then the UE 115*a* may refrain from transmitting the scheduled uplink communication and/or transmit the scheduled uplink communication with one or more modified parameters.

In some aspects, the UE 115*a* may measure an interference level greater than the interference level threshold and transmit the scheduled uplink communication using one or more modified transmission parameters. The modified transmission may include transmitting the scheduled uplink communication using a transmit power less than a default transmit power of the scheduled uplink communication. For example, the UE 115*a* may determine a default power transmission based on path loss, channel conditions, power control loop, etc. The UE 115*a* may reduce the transmit power of the scheduled uplink communication such that interference is less than the interference level threshold. For example, the UE 115*a* may reduce the transmit power by a difference between the measured interference level and the interference level threshold.

In some aspects, the modified transmission may include using a transmit beam different from a scheduled transmit beam of the scheduled uplink communication. The UE 115*a* may transmit the scheduled uplink communication on a beam that may cause less interference to the downlink communication to the UE 115*b*. In this regard, the UE 115*a* may transmit on a beam adjacent to the scheduled transmit beam. Additionally or alternatively, the UE 115*a* may transmit on a wide angle transmit beam different from a scheduled transmit beam having a narrower angle.

In some aspects, the modified transmission may utilize a frequency range less than a scheduled frequency range of the scheduled uplink communication. For example, the UE 115*a* may transmit the scheduled uplink communication using a reduced number of subchannels compared to the number of subchannels indicated in the configured grant for the scheduled uplink communication.

At action 612, the network unit 105 may transmit a downlink communication to the UE 115*b*. In this regard, the network unit 105 may transmit a downlink communication based on a semi-persistent scheduling indicated by network unit 105.

At action 614, the network unit 105 may transmit a second configuration indicating second interference level measurement resources to the UE 115*a*. In some instances, the second interference level measurement resources may be based on a proximity of the UE 115*a* to the UE 115*b*. The interference caused to the UE 115*b* by transmissions of the UE 115*a* may be based on a proximity of the UE 115*a* to the UE 115*b*. A larger amount of interference may be caused to the UE 115*b* when the UE 115*a* is closer to the UE 115*b* as compared to when the UE 115*a* is farther away from the UE 115*b*. The network unit may determine and/or track the proximity of the UE 115*a* to the UE 115*b* and other UEs. In some instances, the interference caused by transmissions of the UE 115*a* may be based on the mobility of the UE 115*a* with respect to other UEs. The UE 115*a* may receive a second, a third, a fourth, etc. configuration from the network unit indicating the interference level measurement resources that the UE 115*a* should use to measure interference levels based on the channel reciprocity of the UE 115*a* with other UEs in proximity to the UE 115*a*. In some aspects, the configuration may include a list (e.g., a lookup table) that associates the resources of the UE 115*a*'s configured grant to the interference level measurement resources for each of the UEs that are in proximity to the UE 115*a*. The UE 115*a* may receive updated configurations (e.g., an updated list of associations between the CG and the interference level measurement resources) indicating the interference level measurement resources that the UE 115*a* should measure interference levels based on the proximity of the UE 115*a* to other UEs. If the UE 115*b* moves away from the UE 115*a* (e.g., moves further than a distance threshold), the UE 115*a* may receive an updated configuration that does not include interference level measurement resources associated with the UE 115*b*. If a third UE moves closer to the UE 115*a* (e.g., moves closer than a distance threshold), the UE 115*a* may receive an updated configuration that includes interference level measurement resources associated with the third UE. The configuration may be updated periodically and/or based on an event (e.g., the distance between the UE 115*a* and other UEs satisfies a distance threshold).

At action 616, the UE 115*b* may transmit a second reference signal (e.g., an SRS) to the UE 115*a*. In this regard, the UE 115*b* may transmit the SRS in the second interference level measurement resources indicated in the configuration transmitted to the UE 115*a* at action 614.

At action 618, the UE 115*a* may measure the SRS transmitted by the UE 115*b* at action 616. The UE 115*a* may measure the interference level associated with the SRS in the second interference level measurement resources indicated in the second configuration transmitted to the UE 115*a* at action 614. For example, the UE 115*a* may measure a received signal strength indicator (RSSI) associated with the SRS, a reference signal received power (RSRP), and/or other measurement parameter associated with the SRS.

At action 619, the UE 115*a* may transmit an interference level indicator to the network unit 105. In some aspects, the UE 115*a* may report the interference level associated with the UE 115*b* to the network unit 105. In this regard, the UE 115*a* may transmit an indicator indicating the interference level via a channel state information (CSI) report, a layer 3 control message, uplink control information (UCI), a medium access control-control element (MAC-CE) message, a PUSCH communication, and/or a PUCCH communication.

At action 620, the UE 115*a* may transmit or refrain from transmitting the scheduled uplink communication based on whether the measured interference level satisfies the interference level threshold. For example, if the interference level is less than the interference level threshold, then the UE 115*a* may transmit the scheduled uplink communication. If the interference level is greater than or equal to or equal to (or just greater than in some instances) the interference level threshold, then the UE 115*a* may refrain from transmitting the scheduled uplink communication and/or transmit the scheduled uplink communication with one or more modified parameters.

At action 622, the network unit 105 may transmit a downlink communication to the UE 115*b*. In this regard, the network unit 105 may transmit a downlink communication based on a semi-persistent scheduling indicated by network unit 105.

Figure 7:
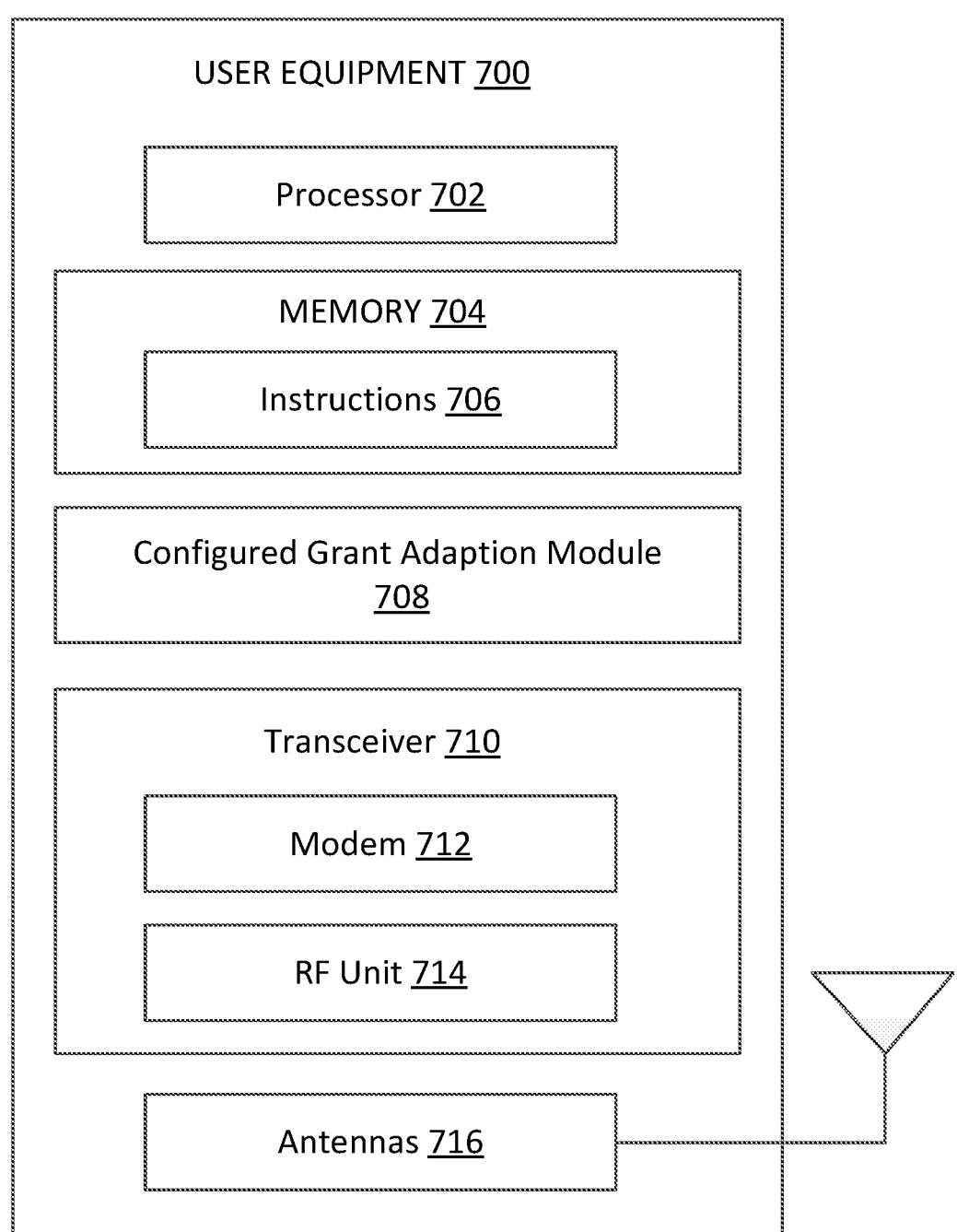
FIG. 7 is a block diagram of an exemplary user equipment (UE) according to some aspects of the present disclosure.

FIG. 7 is a block diagram of an exemplary UE 700 according to some aspects of the present disclosure. The UE 700 may be the UE 115 in the network 100 or 200 as discussed above. As shown, the UE 700 may include a processor 702, a memory 704, a configured grant adaption module 708, a transceiver 710 including a modem subsystem 712 and a radio frequency (RF) unit 714, and one or more antennas 716. These elements may be coupled with each other and in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 704 includes a non-transitory computer-readable medium. The memory 704 may store instructions 706. The instructions 706 may include instructions that, when executed by the processor 702, cause the processor 702 to perform the operations described herein with reference to the UEs 115 in connection with aspects of the present disclosure, for example, aspects of FIGS. 3-6. Instructions 706 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The configured grant adaption module 708 may be implemented via hardware, software, or combinations thereof. For example, the configured grant adaption module 708 may be implemented as a processor, circuit, and/or instructions 706 stored in the memory 704 and executed by the processor 702. In some aspects, In some aspects, the configured grant adaption module 708 may implement the aspects of FIGS. 3-6. For example, the configured grant adaption module 708 may receive from a network unit operating in full duplex mode, a configuration indicating scheduled uplink communication resources and interference level measurement resources. The configured grant adaption module 708 may measure, based on the interference level measurement resources, an interference level associated with a second UE and perform, for a scheduled uplink communication, at least one of transmitting, based on the measured interference level associated with the second UE and based on the scheduled uplink communication resources, the scheduled uplink communication or refraining, based on the measured interference level associated with the second UE, from transmitting the scheduled uplink communication.

As shown, the transceiver 710 may include the modem subsystem 712 and the RF unit 714. The transceiver 710 can be configured to communicate bi-directionally with other devices, such as the BSs 105 and/or the UEs 115. The modem subsystem 712 may be configured to modulate and/or encode the data from the memory 704 and the according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The antennas 716 may include multiple antennas of similar or different designs in order to sustain multiple transmission links. The RF unit 714 may configure the antennas 716.

In some instances, the UE 700 can include multiple transceivers 710 implementing different RATs (e.g., NR and LTE). In some instances, the UE 700 can include a single transceiver 710 implementing multiple RATs (e.g., NR and LTE). In some instances, the transceiver 710 can include various components, where different combinations of components can implement RATs.

Figure 8:
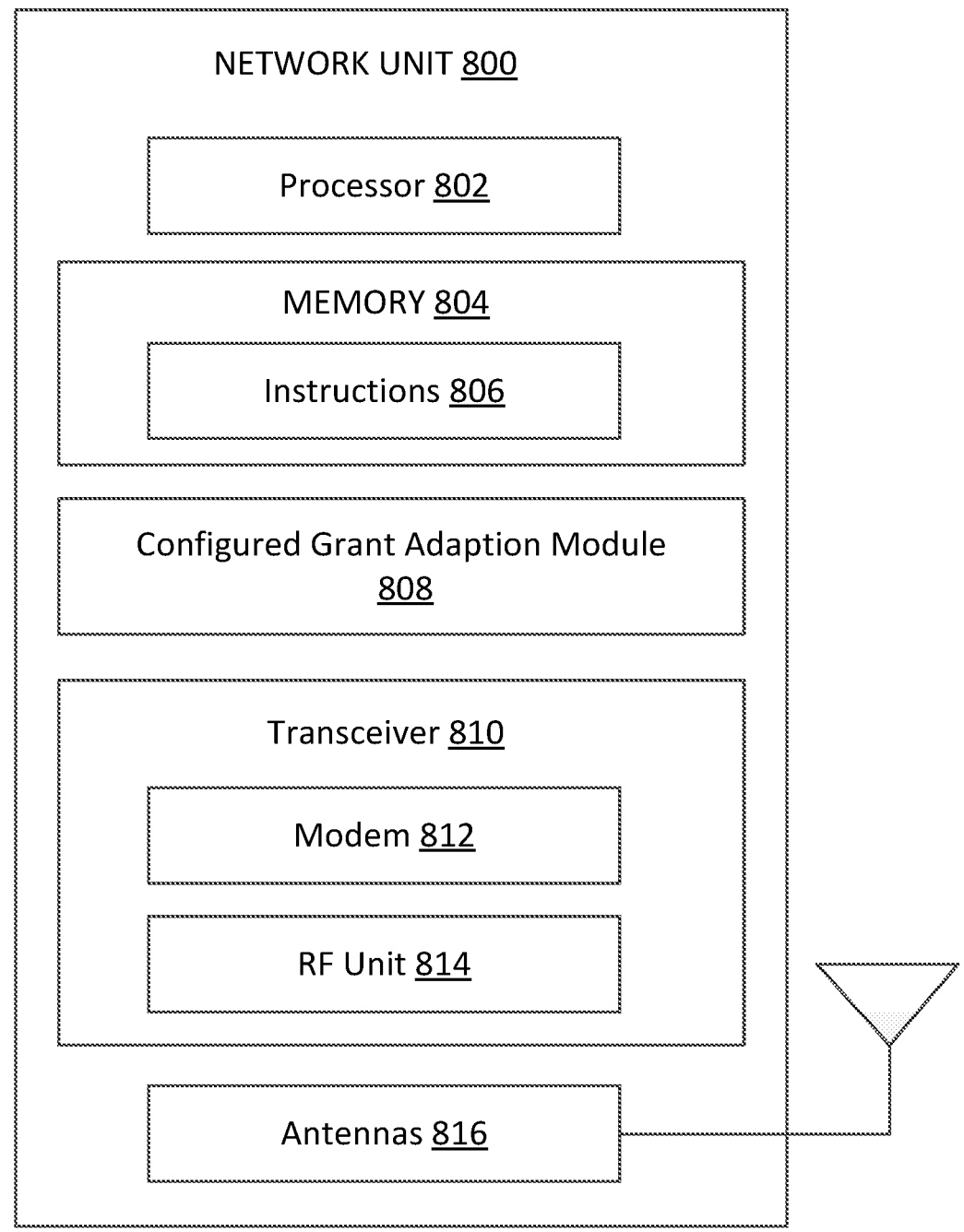
FIG. 8 is a block diagram of an exemplary network unit according to some aspects of the present disclosure.

FIG. 8 is a block diagram of an exemplary network unit 800 according to some aspects of the present disclosure. The network unit 800 may be the BS 105, the CU 210, the DU 230, or the RU 240, as discussed above. As shown, the network unit 800 may include a processor 802, a memory 804, a configured grant adaption module 808, a transceiver 810 including a modem subsystem 812 and a RF unit 814, and one or more antennas 816. These elements may be coupled with each other and in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 3-6. Instructions 806 may also be referred to as code, which may be interpreted broadly to include any type of computer-readable statement(s).

The configured grant adaption module 808 may be implemented via hardware, software, or combinations thereof. For example, the configured grant adaption module 808 may be implemented as a processor, circuit, and/or instructions 806 stored in the memory 804 and executed by the processor 802.

In some aspects, the configured grant adaption module 808 may implement the aspects of FIGS. 3-6. For example, the configured grant adaption module 808 may transmit, to a first user equipment (UE), a configuration indicating scheduled uplink communication resources and interference level measurement resources. The configured grant adaption module 808 may receive, from the first UE, an indicator indicating an interference level associated with a second UE. The configured grant adaption module 808 may perform, for a scheduled uplink communication, at least one of receiving, based on the indicator indicating the interference level associated with the second UE and based on the scheduled uplink communication resources, the scheduled uplink communication or refraining from monitoring, based on the indicator indicating the interference level associated with the second UE, for the scheduled uplink communication. Additionally or alternatively, the configured grant adaption module 808 can be implemented in any combination of hardware and software, and may, in some implementations, involve, for example, processor 802, memory 804, instructions 806, transceiver 810, and/or modem 812.

As shown, the transceiver 810 may include the modem subsystem 812 and the RF unit 814. The transceiver 810 can be configured to communicate bi-directionally with other devices, such as the UEs 115 and/or 700. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/ encoded data from the modem subsystem 812 (on outbound transmissions) or of transmissions originating from another source such as a UE 115 or UE 700. The RF unit 814 may be further configured to perform analog beamforming in conjunction with the digital beamforming. Although shown as integrated together in transceiver 810, the modem sub- system 812 and/or the RF unit 814 may be separate devices that are coupled together at the network unit 800 to enable the network unit 800 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, a configuration indicating a plurality of sub-slots within a slot according to aspects of the present disclosure. The antennas 816 may further receive data messages transmitted from other devices and provide the received data messages for processing and/or demodulation at the transceiver 810. The antennas 816 may include multiple antennas of similar or different designs in order to sustain multiple transmission links.

In some instances, the network unit 800 can include multiple transceivers 810 implementing different RATs (e.g., NR and LTE). In some instances, the network unit 800 can include a single transceiver 810 implementing multiple RATs (e.g., NR and LTE). In some instances, the transceiver 810 can include various components, where different com- binations of components can implement RATs.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the actions. For example, a wireless communication device, such as the UE 115 or the UE 700, may utilize one or more components, such as the processor 702, the memory 704, the configured grant adap- tation module 708, the transceiver 710, the modem 712, and the one or more antennas 716, to execute aspects of method 900. The method 900 may employ similar mechanisms as in the networks 100 and 200 and the aspects and actions described with respect to FIGS. 3-6. As illustrated, the method 900 includes a number of enumerated actions, but the method 900 may include additional actions before, after, and in between the enumerated actions. In some aspects, one or more of the enumerated actions may be omitted or performed in a different order.

At action 910, the method 900 includes a first UE (e.g., the UE 115 or the UE 700) receiving a configuration from a network unit (e.g., the BS 105, the RU 240, the DU 230, the CU 210, and/or the network unit 800). The configuration may indicate scheduled uplink communication resources and interference level measurement resources. In this regard, the first UE may receive the configuration including the scheduled uplink communication resources and/or the inter- ference level measurement resources via a radio resource control (RRC) message, downlink control information (DCI), a medium access control-control element (MAC-CE) message, a PDSCH communication, and/or a PDCCH com- munication. In some aspects, the configuration may include a field indicating an association between the scheduled uplink communication resources and the interference level measurement resources. The scheduled uplink communica- tion resources may be indicated as a configured grant (CG). The CG may indicate time/frequency resources that are scheduled for the first UE to transmit communication(s) to the network unit. In some aspects, the interference level measurement resources may indicate time/frequency resources in which the first UE may measure (e.g., sense) interference level(s) from a second UE and/or other UEs.

At action 920, the method 900 includes the first UE measuring an interference level associated with a second UE (e.g., the UE 115 or the UE 700). The first UE may measure the interference level based on the interference level mea- surement resources indicated in the configuration received at action 910. The second UE may transmit a reference signal (e.g., a sounding reference signal (SRS) or other suitable reference signal) to the first UE in the interference level measurement resources. The first UE may measure the interference level associated with the SRS in the interference level measurement resources. For example, the first UE may measure a received signal strength indicator (RSSI) associ- ated with the SRS, a reference signal received power (RSRP), and/or other measurement parameter associated with the SRS.

In some aspects, the channel between the first UE and the second UE may exhibit reciprocity. In this regard, a mea- surement of a signal transmitted by the second UE to the first UE may indicate how a signal transmitted by the first UE may be received by the second UE. For example, the first UE may measure the SRS from the second UE to determine how a transmission by the first UE may cause interference to the second UE. In some aspects, the first UE may evaluate the amount of interference caused to the second UE by a transmission of the first UE by comparing the measured interference level (e.g., the RSSI and/or RSRP of the SRS) to one or more interference level thresholds. In some aspects, the configuration may indicate the interference level threshold(s). The first UE may determine that the interfer- ence caused by the first UE satisfies the threshold based on the interference level measurement (e.g., the RSSI, RSRP, and/or other measurement of the SRS) being greater than or equal to (or just greater than in some instances) the inter- ference level threshold. The first UE may determine that the interference level does not satisfy the threshold based on the interference level measurement being less than or equal to (or just less than in some instances) the interference level threshold.

In some aspects, interference between the first UE and the second UE may be based on an amount of overlap (e.g., no overlap, complete overlap, and/or partial overlap) of down- link and uplink frequency bands. For example, when the first UE and the second UE communicate with a network unit in full duplex mode using non-overlapping, partially overlapping, and/or fully overlapping uplink and downlink frequency bands, an uplink communication (e.g., a CG transmission) by the first UE may interfere with a downlink communication (e.g., semi-persistent scheduling transmission by a network unit) to the second UE. The configuration received at action 910 may indicate to the first UE if the scheduled uplink transmission is in an overlapping frequency band with a downlink transmission to the second UE. The configuration received at action 910 may further indicate to the first UE if the scheduled uplink transmission is in an overlapping time period (e.g., same slot and/or sublot) as the downlink transmission to the second UE.

In some aspects, the first UE may report the interference level associated with the second UE to the network unit. In this regard, the first UE may transmit an indicator indicating the interference level via a channel state information (CSI) report, a layer 3 control message, uplink control information (UCI), a medium access control-control element (MAC-CE) message, a PUSCH communication, and/or a PUCCH communication. The first UE may transmit the indicator indicating the interference level on a periodic basis and/or an aperiodic basis. The first UE may transmit the indicator indicating the interference level to the network unit based on the periodicity associated with the CG. In some aspects, the first UE may report the interference level associated with the second UE as a code point. For example, a single code point (e.g., 0 or 1) may indicate whether the interference level satisfies the threshold (e.g., 1) or does not satisfy the threshold (e.g., 0). In some aspects, the configuration may include multiple thresholds. Multiple code points may indicate which, if any, of the interference levels are satisfied.

In some aspects, the first UE may receive a second configuration indicating second interference level measurement resources. In some instances, the second interference level measurement resources may be based on a proximity of the first UE to the second UE. The interference caused to the second UE by transmissions of the first UE may be based on a proximity of the first UE to the second UE. A larger amount of interference may be caused to the second UE when the first UE is closer to the second UE as compared to when the first UE is farther away from the second UE. The network unit may determine and/or track the proximity of the first UE to the second UE and other UEs. In some instances, the interference caused by transmissions of the first UE may be based on the mobility of the first UE with respect to other UEs. The first UE may receive a second, a third, a fourth, etc. configuration from the network unit indicating the interference level measurement resources that the first UE should use to measure interference levels based on the channel reciprocity of the first UE with other UEs in proximity to the first UE. In some aspects, the configuration may include a list (e.g., a lookup table) that associates the resources of the first UE's configured grant to the interference level measurement resources for each of the UEs that are in proximity to the first UE. The first UE may receive updated configurations (e.g., an updated list of associations between the CG and the interference level measurement resources) indicating the interference level measurement resources that the first UE should measure interference levels based on the proximity of the first UE to other UEs. If the second UE moves away from the first UE (e.g., moves further than a distance threshold), the first UE may receive an updated configuration that does not include interference level measurement resources associated with the second UE. If a third UE moves closer to the first UE (e.g., moves closer than a distance threshold), the first UE may receive an updated configuration that includes interference level measurement resources associated with the third UE. The configuration may be updated periodically and/or based on an event (e.g., the distance between the first UE and other UEs satisfies a distance threshold).

In some aspects, the interference level threshold may be based on parameters associated with one or more downlink communications. For example, the network unit may determine the interference level threshold based on the parameters associated with semi-persistent scheduled downlink communications to the second UE. In some aspects, the network unit may configure the same interference level threshold for each UE (or group of UEs) scheduled for downlink communications or a different interference level threshold for each of the UEs (or group of UEs) scheduled for downlink communications. The network unit may determine the interference level threshold(s) based on the parameters associated with the scheduled downlink communications to the second UE and/or other UEs. For example, the interference level threshold may be based on a modulation and coding scheme (MCS) associated with the downlink communications, time/frequency resources associated with the downlink communications, an overlap between the downlink communication frequency band and the uplink communication frequency band, a guard band between the downlink communication frequency band and the uplink communication frequency band, and/or other suitable communication parameters.

At action 930, the method 900 includes the first UE transmitting a scheduled uplink communication based on the measured interference level associated with the second UE and based on the scheduled uplink communication resources. In some aspects, the first UE may refrain from transmitting the scheduled uplink communication based on the measured interference level associated with the second UE. In this regard, the first UE may transmit or refrain from transmitting the scheduled uplink communication based on whether the measured interference level satisfies the interference level threshold. For example, if the interference level is less than the interference level threshold, then the first UE may transmit the scheduled uplink communication. If the interference level is greater than or equal to or equal to (or just greater than in some instances) the interference level threshold, then the first UE may refrain from transmitting the scheduled uplink communication and/or transmit the scheduled uplink communication with one or more modified parameters. The first UE may refrain from transmitting the scheduled uplink communication and/or transmit the scheduled uplink communication with the modified parameter(s) in order to reduce potential interference with the downlink communication to the second UE.

In some aspects, the first UE may measure an interference level greater than the interference level threshold and transmit the scheduled uplink communication using one or more modified transmission parameters. The modified transmission may include transmitting the scheduled uplink communication using a transmit power less than a default transmit power of the scheduled uplink communication. For example, the first UE may determine a default power transmission based on path loss, channel conditions, power control loop, etc. The first UE may reduce the transmit power of the scheduled uplink communication such that interference is less than the interference level threshold. For example, the first UE may reduce the transmit power by a difference between the measured interference level and the interference level threshold.

In some aspects, the modified transmission may include using a transmit beam different from a scheduled transmit beam of the scheduled uplink communication. The first UE may transmit the scheduled uplink communication on a beam that may cause less interference to the downlink communication to the second UE. In this regard, the first UE may transmit on a beam adjacent to the scheduled transmit beam. Additionally or alternatively, the first UE may transmit on a wide angle transmit beam different from a scheduled transmit beam having a narrower angle.

In some aspects, the modified transmission may utilize a frequency range less than a scheduled frequency range of the scheduled uplink communication. For example, the first UE may transmit the scheduled uplink communication using a reduced number of subchannels compared to the number of subchannels indicated in the configured grant for the scheduled uplink communication.

In some aspects, the first UE may transmit the scheduled uplink communication or refrain from transmitting the scheduled uplink communication based on a duplex mode associated with the network unit. In some aspects, the network unit may configure certain time periods (e.g., slots, sub-slots, frames, etc.) as half duplex and other time periods as full duplex. The first UE may transmit the scheduled uplink communication as scheduled when the network unit is operating in half duplex mode. For example, the first UE may transmit the scheduled uplink communication when the slot associated with the scheduled uplink communication is configured as an uplink slot. When the slot associated with the scheduled uplink communication is configured for full duplex as an uplink/downlink slot, the first UE may transmit the scheduled uplink communication when the measured interference level is less than or equal to (or just less than in some instances) the interference level threshold. When the slot associated with the scheduled uplink communication is configured for full duplex as an uplink/downlink slot, the first UE may refrain from transmitting the scheduled uplink communication when the measured interference level is greater than or equal to (or just greater than in some instances) the interference level threshold.

In some aspects, the first UE may transmit the scheduled uplink communication or refrain from transmitting the scheduled uplink communication based on an amount of overlap of the scheduled uplink communication and a scheduled downlink communication from the network unit to the second UE. The first UE may receive a configuration from the network unit indicating which slots have an overlap between the scheduled uplink communication and a downlink communication to the second UE. The configuration may indicate which slots have an overlap between the scheduled uplink communications and downlink communications to other UEs that may potentially be affected by interference from the first UE. In this regard, the configuration may include a bitmap indicating overlapping slots of the scheduled uplink communication and the scheduled downlink communication(s) from the network unit to the second UE and/or other UEs. Additionally or alternatively, the configuration may indicate a periodicity (e.g., a number of slots, number of ms, or otherwise) and an offset (e.g., an offset from the beginning of a frame and/or subframe, an offset relative to a reference time, or otherwise) indicating overlapping slots of the scheduled uplink communication and the scheduled downlink communication(s). In some aspects, the first UE may receive an initial configuration via RRC indicating the overlap and periodically receive an update to the configuration. For example, the first UE may receive an update to the configuration every x subframes via a MAC-CE message, DCI, or other suitable communication. The first UE may transmit the scheduled uplink communication when there is no overlap between the scheduled uplink communication and the downlink communication. The first UE may also transmit the scheduled uplink communication when there is overlap, but the measured interference level is less than or equal to (or just less than in some instances) the interference level threshold. The first UE may refrain from transmitting the scheduled uplink communication when there is overlap and the measured interference level is greater than or equal to (or just greater than in some instances) the interference level threshold.

In some aspects, the first UE may transmit the scheduled uplink communication or refrain from transmitting the scheduled uplink communication based on a comparison of priority levels associated with the scheduled uplink communication and the scheduled downlink communication. The first UE may receive a configuration from the network unit indicating a priority level associated with the scheduled downlink communication to the second UE. The first UE may transmit the scheduled uplink communication when the priority level of the scheduled uplink communication is greater than or equal to (or just greater than in some instances) the priority level associated with the downlink communication. The first UE may transmit the scheduled uplink communication when the priority level of the scheduled uplink communication is greater than or equal to (or just greater than in some instances) the priority level associated with the downlink communication and the measured interference level is less than or equal to (or just less than in some instances) the interference level threshold. The first UE may refrain from transmitting the scheduled uplink communication when the priority level of the scheduled uplink communication is less than or equal to (or just less than in some instances) the priority level associated with the downlink communication and the measured interference level is greater than or equal to (or just greater than in some instances) the interference level threshold.

In some aspects, the first UE may transmit the scheduled uplink communication or refrain from transmitting the scheduled uplink communication based on a frequency separation between a frequency band associated with the scheduled uplink communication and a frequency band associated with the scheduled downlink communication. The first UE may receive a configuration from the network unit indicating the frequency separation between the frequency band associated with the scheduled uplink communication and the frequency band associated with the scheduled downlink communication. The frequency separation may be indicated as a number of subchannels, a frequency range, a frequency band, or other suitable frequency separation indicator. If the frequency separation is large enough, the scheduled uplink communication may not cause interference over the interference level threshold to the downlink communication. The first UE may transmit the scheduled uplink communication when the frequency separation between the frequency band associated with the scheduled uplink communication and the frequency band associated with the scheduled downlink communication is greater than or equal to (or just greater than in some instances) a frequency separation threshold. The first UE may transmit the scheduled uplink communication when the frequency separation between the frequency band associated with the scheduled uplink communication and the frequency band associated with the scheduled downlink communication is greater than or equal to (or just greater than in some instances) the frequency separation threshold and the measured interference level is less than or equal to (or just less than in some instances) the interference level threshold. The first UE may refrain from transmitting the scheduled uplink communication when the frequency separation between the frequency band associated with the scheduled uplink communication and the frequency band associated with the scheduled downlink communication is less than or equal to (or just less than in some instances) the frequency separation threshold and the measured interference level is greater than or equal to (or just greater than in some instances) the interference level threshold.

In some aspects, the first UE may transmit the scheduled uplink communication or refrain from transmitting the scheduled uplink communication based on a repetition associated with the scheduled uplink communication. The first UE may receive a configuration from the network unit indicating whether the first UE is configured to repeat the scheduled uplink transmission. The configuration may indicate no repetition of the scheduled uplink transmission and/or repetition (e.g., a number of repetitions) of the scheduled uplink communication. If the scheduled uplink transmission is repeated, the probability of a successful decoding of the scheduled uplink communication by the network unit is increased as compared to no repetitions. The first UE may transmit the scheduled uplink communication when no repetitions of the scheduled uplink communication are configured and the measured interference level is greater than or equal to (or just greater than in some instances) the interference level threshold. The first UE may refrain from transmitting the scheduled uplink communication when repetitions of the scheduled uplink communication are configured and the measured interference level is greater than or equal to (or just greater than in some instances) the interference level threshold.

In some aspects, the first UE may transmit the scheduled uplink communication or refrain from transmitting the scheduled uplink communication based on a repetition associated with the scheduled downlink communication to the second UE. The first UE may receive a configuration from the network unit indicating whether the network unit is configured to repeat the scheduled downlink transmission. The configuration may indicate no repetition of the scheduled downlink transmission and/or repetition (e.g., a number of repetitions) of the scheduled downlink communication. If the scheduled downlink transmission is repeated, the probability of a successful decoding of the scheduled downlink communication by the second UE is increased as compared to no repetitions. The first UE may transmit the scheduled uplink communication when repetitions of the scheduled downlink communication are configured and the measured interference level is greater than or equal to (or just greater than in some instances) the interference level threshold. The first UE may refrain from transmitting the scheduled uplink communication when no repetitions of the scheduled downlink communication are configured and the measured interference level is greater than or equal to (or just greater than in some instances) the interference level threshold.

In some aspects, the scheduled uplink communication may be scheduled to be repeated over multiple contiguous slots. The first UE may refrain from transmitting the scheduled uplink communication in all of the multiple contiguous slots when the measured interference level is greater than or equal to (or just greater than in some instances) the interference level threshold. Additionally or alternatively, the first UE may refrain from transmitting the scheduled uplink communication in certain slots of the multiple contiguous slots. For example, the first UE may transmit the first scheduled uplink transmission and refrain from transmitting one or more of the repeated uplink communications when the measured interference level is greater than or equal to (or just greater than in some instances) the interference level threshold. The first UE may refrain from transmitting one or more of the repeated uplink communications based on a redundancy version of the repeated uplink communications when the measured interference level is greater than or equal to (or just greater than in some instances) the interference level threshold. For example, the first UE may refrain from transmitting the repeated uplink communications when the repeated uplink communication has a redundancy version other than RV0. In some aspects, the scheduled uplink communication may include a transport block scheduled over multiple contiguous slots. If the measured interference level associated with one or more of the multiple contiguous slots is greater than or equal to (or just greater than in some instances) the interference level threshold, the first UE may refrain from transmitting the TB over the multiple contiguous slots and/or the first UE may transmit the TB over the multiple contiguous slots. For example, the first UE may transmit the first scheduled TB over the multiple contiguous slots and refrain from transmitting one or more of the repeated TB over the multiple contiguous slots when the measured interference level is greater than or equal to (or just greater than in some instances) the interference level threshold. In some aspects, the first UE may refrain from transmitting the scheduled TB over the multiple contiguous slots when the TB has a redundancy version other than RV0. In some aspects, the first UE may refrain from transmitting the TB over multiple contiguous slots when a threshold number of the slots of the multiple contiguous slots has a measured interference level greater than or equal to (or just greater than in some instances) the interference level threshold.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the actions. For example, a wireless communication device, such as the BS 105 or the network unit 800, may utilize one or more components, such as the processor 802, the memory 804, the configured grant adaptation module 808, the transceiver 810, the modem 812, and the one or more antennas 816, to execute aspects of method 1000. The method 1000 may employ similar mechanisms as in the networks 100 and 200 and the aspects and actions described with respect to FIGS. 3-6. As illustrated, the method 1000 includes a number of enumerated actions, but the method 1000 may include additional actions before, after, and in between the enumerated actions. In some aspects, one or more of the enumerated actions may be omitted or performed in a different order.

At action 1010, the method 1000 includes a network unit (e.g., BS 105, the CU 210, the DU 230, the RU 240, or the network unit 800) transmitting a configuration to a UE (e.g., the UE 115 or the UE 700). The configuration may indicate scheduled uplink communication resources and interference level measurement resources. In this regard, the network unit may transmit the configuration including the scheduled uplink communication resources and/or the interference level measurement resources via a radio resource control (RRC) message, downlink control information (DCI), a medium access control-control element (MAC-CE) message, a PDSCH communication, and/or a PDCCH communication. In some aspects, the configuration may include a field indicating an association between the scheduled uplink communication resources and the interference level measurement resources. The scheduled uplink communication resources may be indicated as a configured grant (CG). The CG may indicate time/frequency resources that are scheduled for the first UE to transmit communication(s) to the network unit. In some aspects, the interference level measurement resources may indicate time/frequency resources in which the first UE may measure (e.g., sense) interference level(s) from a second UE and/or other UEs.

At action 1020, the method 1000 includes the network unit receiving an indicator from the first UE indicating an interference level associated with a second UE (e.g., the UE 115 or the UE 700). In this regard, the network unit may receive the indicator indicating the interference level via a channel state information (CSI) report, a layer 3 control message, uplink control information (UCI), a medium access control-control element (MAC-CE) message, a PUSCH communication, and/or a PUCCH communication. The network unit may receive the indicator indicating the interference level on a periodic basis and/or an aperiodic basis. The network unit may receive the indicator indicating the interference level from the first UE based on the periodicity associated with the CG. In some aspects, the first UE may report the interference level associated with the second UE as a code point. For example, a single code point (e.g., 0 or 1) may indicate whether the interference level satisfies the threshold (e.g., 1) or does not satisfy the threshold (e.g., 0). In some aspects, the configuration may include multiple thresholds. Multiple code points may indicate which, if any, of the interference levels are satisfied.

The first UE may measure the interference level based on the interference level measurement resources indicated in the configuration transmitted by the network unit at action 1010. The second UE may transmit a reference signal (e.g., a sounding reference signal (SRS) or other suitable reference signal) to the first UE in the interference level measurement resources. The first UE may measure the interference level associated with the SRS in the interference level measurement resources. For example, the first UE may measure a received signal strength indicator (RSSI) associated with the SRS, a reference signal received power (RSRP), and/or other measurement parameter associated with the SRS.

In some aspects, the channel between the first UE and second UE may exhibit reciprocity. In this regard, a measurement of a signal transmitted by the second UE to the first UE may indicate how a signal transmitted by the first UE may be received by the second UE. For example, the first UE may measure the SRS from the second UE to determine how a transmission by the first UE may cause interference to the second UE. In some aspects, the first UE may evaluate the amount of interference caused to the second UE by a transmission of the first UE by comparing the measured interference level (e.g., the RSSI and/or RSRP of the SRS) to one or more interference level thresholds. In some aspects, the configuration may indicate the interference level threshold(s). The first UE may determine that the interference caused by the first UE satisfies the threshold based on the interference level measurement (e.g., the RSSI, RSRP, and/or other measurement of the SRS) being greater than or equal to (or just greater than in some instances) the interference level threshold. The first UE may determine that the interference level does not satisfy the threshold based on the interference level measurement being less than or equal to (or just less than in some instances) the interference level threshold.

In some aspects, interference between the first UE and the second UE may be based on an amount of overlap (e.g., no overlap, complete overlap, and/or partial overlap) of downlink and uplink frequency bands. For example, when the first UE and the second UE communicate with a network unit in full duplex mode using non-overlapping, partially overlapping, and/or fully overlapping uplink and downlink frequency bands, an uplink communication (e.g., a CG transmission) by the first UE may interfere with a downlink communication (e.g., semi-persistent scheduling transmission by a network unit) to the second UE. The configuration transmitted by the network unit at action 1010 may indicate to the first UE if the scheduled uplink transmission is in an overlapping frequency band with a downlink transmission to the second UE. The configuration transmitted by the network unit at action 1010 may further indicate to the first UE if the scheduled uplink transmission is in an overlapping time period (e.g., same slot and/or sublot) as the downlink transmission to the second UE.

In some aspects, the network unit may transmit a second configuration indicating second interference level measurement resources. In some instances, the second interference level measurement resources may be based on a proximity of the first UE to the second UE. The interference caused to the second UE by transmissions of the first UE may be based on a proximity of the first UE to the second UE. A larger amount of interference may be caused to the second UE when the first UE is closer to the second UE as compared to when the first UE is farther away from the second UE. The network unit may determine and/or track the proximity of the first UE to the second UE and other UEs. In some instances, the interference caused by transmissions of the first UE may be based on the mobility of the first UE with respect to other UEs. The network unit may transmit a second, a third, a fourth, etc. configuration to the first UE indicating the interference level measurement resources that the first UE should use to measure interference levels based on the channel reciprocity of the first UE with other UEs in proximity to the first UE. In some aspects, the configuration may include a list (e.g., a lookup table) that associates the resources of the first UE's configured grant to the interference level measurement resources for each of the UEs that are in proximity to the first UE. The network unit may transmit updated configurations (e.g., an updated list of associations between the CG and the interference level measurement resources) indicating the interference level measurement resources that the first UE should measure interference levels based on the proximity of the first UE to other UEs. If the second UE moves away from the first UE (e.g., moves further than a distance threshold), the network unit may transmit an updated configuration that does not include interference level measurement resources associated with the second UE. If a third UE moves closer to the first UE (e.g., moves closer than a distance threshold), the network unit may transmit an updated configuration that includes interference level measurement resources associated with the third UE. The configuration may be updated periodically and/or based on an event (e.g., the distance between the first UE and other UEs satisfies a distance threshold).

In some aspects, the interference level threshold may be based on parameters associated with one or more downlink communications. For example, the network unit may determine the interference level threshold based on the parameters associated with semi-persistent scheduled downlink communications to the second UE. In some aspects, the network unit may configure the same interference level threshold for each UE (or group of UEs) scheduled for downlink communications or a different interference level threshold for each of the UEs (or group of UEs) scheduled for downlink communications. The network unit may determine the interference level threshold(s) based on the parameters associated with the scheduled downlink communications to the second UE and/or other UEs. For example, the interference level threshold may be based on a modulation and coding scheme (MCS) associated with the downlink communications, time/frequency resources associated with the downlink communications, an overlap between the downlink communication frequency band and the uplink communication frequency band, a guard band between the downlink communication frequency band and the uplink communication frequency band, and/or other suitable communication parameters.

At action 1030, the method 1000 includes the network unit receiving a scheduled uplink communication based on the measured interference level associated with the second UE and based on the scheduled uplink communication resources. In some aspects, the network unit may refrain from monitoring for the scheduled uplink communication based on the measured interference level associated with the second UE. In this regard, the network unit may receive or refrain from monitoring for the scheduled uplink communication based on whether the measured interference level satisfies the interference level threshold. For example, if the interference level is less than the interference level threshold, then the network unit may receive the scheduled uplink communication. If the interference level is greater than or equal to or equal to (or just greater than in some instances) the interference level threshold, then the network unit may refrain from monitoring for the scheduled uplink communication and/or receive the scheduled uplink communication with one or more modified parameters.

In some aspects, the first UE may measure an interference level greater than the interference level threshold and transmit the scheduled uplink communication using one or more modified transmission parameters. The modified transmission may include transmitting the scheduled uplink communication using a transmit power less than a default transmit power of the scheduled uplink communication. For example, the first UE may determine a default power transmission based on path loss, channel conditions, power control loop, etc. The first UE may reduce the transmit power of the scheduled uplink communication such that interference is less than the interference level threshold. For example, the first UE may reduce the transmit power by a difference between the measured interference level and the interference level threshold.

In some aspects, the modified transmission may include using a transmit beam different from a scheduled transmit beam of the scheduled uplink communication. The network unit may receive the scheduled uplink communication on a beam that may cause less interference to the downlink communication to the second UE. In this regard, the network unit may receive the scheduled uplink communication on a beam adjacent to the scheduled beam. Additionally or alternatively, the network unit may receive the scheduled uplink communication on a wide angle transmit beam different from a scheduled beam having a narrower angle.

In some aspects, the modified transmission may utilize a frequency range less than a scheduled frequency range of the scheduled uplink communication. For example, the network unit may receive the scheduled uplink communication using a reduced number of subchannels compared to the number of subchannels indicated in the configured grant for the scheduled uplink communication.

In some aspects, the network unit may receive the scheduled uplink communication or refrain from monitoring for the scheduled uplink communication based on a duplex mode associated with the network unit. In some aspects, the network unit may configure certain time periods (e.g., slots, sub-slots, frames, etc.) as half duplex and other time periods as full duplex. The network unit may receive the scheduled uplink communication as scheduled when the network unit is operating in half duplex mode. For example, the network unit may receive the scheduled uplink communication when the slot associated with the scheduled uplink communication is configured as an uplink slot. When the slot associated with the scheduled uplink communication is configured for full duplex as an uplink/downlink slot, the network unit may receive the scheduled uplink communication when the measured interference level is less than or equal to (or just less than in some instances) the interference level threshold. When the slot associated with the scheduled uplink communication is configured for full duplex as an uplink/downlink slot, the network unit may refrain from monitoring for the scheduled uplink communication when the measured interference level is greater than or equal to (or just greater than in some instances) the interference level threshold.

In some aspects, the network unit may receive the scheduled uplink communication or refrain from monitoring for the scheduled uplink communication based on an amount of overlap of the scheduled uplink communication and a scheduled downlink communication from the network unit to the second UE. The network unit may transmit a configuration to the first UE indicating which slots have an overlap between the scheduled uplink communication and a downlink communication to the second UE. The configuration may indicate which slots have an overlap between the scheduled uplink communications and downlink communications to other UEs that may potentially be affected by interference from the first UE. In this regard, the configuration may include a bitmap indicating overlapping slots of the scheduled uplink communication and the scheduled downlink communication(s) from the network unit to the second UE and/or other UEs. Additionally or alternatively, the configuration may indicate a periodicity (e.g., a number of slots, number of ms, or otherwise) and an offset (e.g., an offset from the beginning of a frame and/or subframe, an offset relative to a reference time, or otherwise) indicating overlapping slots of the scheduled uplink communication and the scheduled downlink communication(s). In some aspects, the first UE may receive an initial configuration via RRC indicating the overlap and periodically receive an update to the configuration. For example, network unit may transmit an update to the configuration every x subframes via a MAC-CE message, DCI, or other suitable communication. The network unit may receive the scheduled uplink communication the scheduled uplink communication when there is no overlap between the scheduled uplink communication and the downlink communication. The network unit may receive the scheduled uplink communication when there is overlap, but the measured interference level is less than or equal to (or just less than in some instances) the interference level threshold. The network unit may refrain from monitoring for the scheduled uplink communication when there is overlap and the measured interference level is greater than or equal to (or just greater than in some instances) the interference level threshold.

In some aspects, the network unit may receive the scheduled uplink communication or refrain from monitoring for the scheduled uplink communication based on a comparison of priority levels associated with the scheduled uplink communication and the scheduled downlink communication. The network unit may transmit a configuration to the first UE indicating a priority level associated with the scheduled downlink communication to the second UE. The network unit may receive the scheduled uplink communication when the priority level of the scheduled uplink communication is greater than or equal to (or just greater than in some instances) the priority level associated with the downlink communication. The network unit may receive the scheduled uplink communication when the priority level of the scheduled uplink communication is greater than or equal to (or just greater than in some instances) the priority level associated with the downlink communication and the measured interference level is less than or equal to (or just less than in some instances) the interference level threshold. The network unit may refrain from monitoring for the scheduled uplink communication when the priority level of the scheduled uplink communication is less than or equal to (or just less than in some instances) the priority level associated with the downlink communication and the measured interference level is greater than or equal to (or just greater than in some instances) the interference level threshold.

In some aspects, the network unit may receive the scheduled uplink communication or refrain from monitoring for the scheduled uplink communication based on a frequency separation between a frequency band associated with the scheduled uplink communication and a frequency band associated with the scheduled downlink communication. The network unit may transmit a configuration to the first UE indicating the frequency separation between the frequency band associated with the scheduled uplink communication and the frequency band associated with the scheduled downlink communication. The frequency separation may be indicated as a number of subchannels, a frequency range, a frequency band, or other suitable frequency separation indicator. If the frequency separation is large enough, the scheduled uplink communication may not cause interference over the interference level threshold to the downlink communication. The network unit may receive the scheduled uplink communication when the frequency separation between the frequency band associated with the scheduled uplink communication and the frequency band associated with the scheduled downlink communication is greater than or equal to (or just greater than in some instances) a frequency separation threshold. The network unit may receive the scheduled uplink communication when the frequency separation between the frequency band associated with the scheduled uplink communication and the frequency band associated with the scheduled downlink communication is greater than or equal to (or just greater than in some instances) the frequency separation threshold and the measured interference level is less than or equal to (or just less than in some instances) the interference level threshold. The network unit may refrain from monitoring for the scheduled uplink communication when the frequency separation between the frequency band associated with the scheduled uplink communication and the frequency band associated with the scheduled downlink communication is less than or equal to (or just less than in some instances) the frequency separation threshold and the measured interference level is greater than or equal to (or just greater than in some instances) the interference level threshold.

In some aspects, the network unit may receive the scheduled uplink communication or refrain from monitoring for the scheduled uplink communication based on a repetition associated with the scheduled uplink communication. The network unit may transmit a configuration to the first UE indicating whether the first UE is configured to repeat the scheduled uplink transmission. The configuration may indicate no repetition of the scheduled uplink transmission and/or repetition (e.g., a number of repetitions) of the scheduled uplink communication. If the scheduled uplink transmission is repeated, the probability of a successful decoding of the scheduled uplink communication by the network unit is increased as compared to no repetitions. The network unit may receive the scheduled uplink communication when no repetitions of the scheduled uplink communication are configured and the measured interference level is greater than or equal to (or just greater than in some instances) the interference level threshold. The network unit may refrain from monitoring for the scheduled uplink communication when repetitions of the scheduled uplink communication are configured and the measured interference level is greater than or equal to (or just greater than in some instances) the interference level threshold.

In some aspects, the network unit may receive the scheduled uplink communication or refrain from monitoring for the scheduled uplink communication based on a repetition associated with the scheduled downlink communication to the second UE. The network unit may transmit a configuration to the first UE indicating whether the network unit is configured to repeat the scheduled downlink transmission. The configuration may indicate no repetition of the scheduled downlink transmission and/or repetition (e.g., a number of repetitions) of the scheduled downlink communication. If the scheduled downlink transmission is repeated, the probability of a successful decoding of the scheduled downlink communication by the second UE is increased as compared to no repetitions. The network unit may receive the scheduled uplink communication when repetitions of the scheduled downlink communication are configured and the measured interference level is greater than or equal to (or just greater than in some instances) the interference level threshold. The network unit may refrain from monitoring for the scheduled uplink communication when no repetitions of the scheduled downlink communication are configured and the measured interference level is greater than or equal to (or just greater than in some instances) the interference level threshold.

In some aspects, the scheduled uplink communication may be scheduled to be repeated over multiple contiguous slots. The network unit may refrain from monitoring for the scheduled uplink communication in all of the multiple contiguous slots when the measured interference level is greater than or equal to (or just greater than in some instances) the interference level threshold. Additionally or alternatively, the network unit may refrain from monitoring for the scheduled uplink communication in certain slots of the multiple contiguous slots. For example, the network unit may receive the first scheduled uplink communication and refrain from monitoring for one or more of the repeated uplink communications when the measured interference level is greater than or equal to (or just greater than in some instances) the interference level threshold. The network unit may refrain from monitoring for one or more of the repeated uplink communications based on a redundancy version of the repeated uplink communications when the measured interference level is greater than or equal to (or just greater than in some instances) the interference level threshold. For example, the network unit may refrain from monitoring for the repeated uplink communications when the repeated uplink communication has a redundancy version other than RV0. In some aspects, the scheduled uplink communication may include a transport block scheduled over multiple contiguous slots. If the measured interference level associated with one or more of the multiple contiguous slots is greater than or equal to (or just greater than in some instances) the interference level threshold, the network unit may refrain from monitoring for the TB over the multiple contiguous slots and/or the first UE may transmit the TB over the multiple contiguous slots. For example, the network unit may receive the first scheduled TB over the multiple contiguous slots and refrain from monitoring for one or more of the repeated TB over the multiple contiguous slots when the measured interference level is greater than or equal to (or just greater than in some instances) the interference level threshold. In some aspects, the network unit may refrain from monitoring for the scheduled TB over the multiple contiguous slots when the TB has a redundancy version other than RV0. In some aspects, the network unit may refrain from monitoring for the TB over multiple contiguous slots when a threshold number of the slots of the multiple contiguous slots has a measured interference level greater than or equal to (or just greater than in some instances) the interference level threshold.

Further aspects of the present disclosure include the following:

Aspect 1 includes a method of wireless communication performed by a first user equipment (UE), the method comprising receiving, from a network unit operating in full duplex mode, a configuration indicating scheduled uplink communication resources and interference level measurement resources; measuring, based on the interference level measurement resources, an interference level associated with a second UE; and performing, for a scheduled uplink communication, at least one of transmitting, based on the measured interference level associated with the second UE and based on the scheduled uplink communication resources, the scheduled uplink communication; or refraining, based on the measured interference level associated with the second UE, from transmitting the scheduled uplink communication.

Aspect 2 includes the method of aspect 1, wherein the measuring the interference level associated with the second UE comprises measuring a sounding reference signal (SRS) in the interference level measurement resources.

Aspect 3 includes the method of any of aspects 1-2, wherein the measuring the SRS comprises measuring at least one of a received signal strength indicator (RSSI) associated with the SRS; or a reference signal received power (RSRP) associated with the SRS.

Aspect 4 includes the method of any of aspects 1-3, wherein the configuration further indicates an interference level threshold.

Aspect 5 includes the method of any of aspects 1-4, further comprising transmitting, to the network unit, an indicator indicting whether the measured interference level associated with the second UE satisfies the interference level threshold.

Aspect 6 includes the method of any of aspects 1-5, wherein the refraining from transmitting the scheduled uplink communication comprises refraining from transmitting the scheduled uplink communication based on the interference level being greater than the interference level threshold.

Aspect 7 includes the method of any of aspects 1-6 wherein the transmitting the scheduled uplink communication comprises transmitting the scheduled uplink communication based on the interference level being lower than the interference level threshold.

Aspect 8 includes the method of any of aspects 1-7, wherein the transmitting the scheduled uplink communication comprises transmitting the scheduled uplink based on the interference level not satisfying the interference level threshold with at least one of a transmit power less than a default transmit power of the scheduled uplink communication; a transmit beam different from a scheduled transmit beam of the scheduled uplink communication; a wide angle transmit beam different from a scheduled transmit beam of the scheduled uplink communication; or a frequency range less than a scheduled frequency range of the scheduled uplink communication.

Aspect 9 includes the method of any of aspects 1-8, wherein the receiving the configuration comprises receiving the configuration via at least one of a radio resource control (RRC) message, a medium access control control element (MAC-CE), or downlink control information (DCI).

Aspect 10 includes the method of any of aspects 1-9, further comprising receiving, from the network unit, a second configuration indicating second interference level measurement resources, wherein the second interference level measurement resources are based on a proximity of the first UE to the second UE.

Aspect 11 includes the method of any of aspects 1-10, wherein the receiving the second configuration comprises receiving the second configuration via at least one of a medium access control control element (MAC-CE) or downlink control information (DCI).

Aspect 12 includes the method of any of aspects 1-11, wherein the transmitting the scheduled uplink communication comprises transmitting the scheduled uplink communication in at least one of an uplink frequency band that at least partially overlaps a downlink frequency band or an uplink frequency band that does not overlap a downlink frequency band.

Aspect 13 includes the method of any of aspects 1-12, wherein the performing the at least one of the transmitting or the refraining from transmitting is further based on at least one of a duplex mode associated with a slot scheduled for the scheduled uplink communication; an overlapping of the slot scheduled for the scheduled uplink communication and the slot scheduled for a scheduled downlink communication from the network unit to the second UE; a priority level associated with the scheduled uplink communication; a frequency separation between a frequency band associated with the scheduled uplink communication and a frequency band associated with a scheduled downlink communication; a repetition associated with the scheduled uplink communication; or a repetition associated with a scheduled downlink communication.

Aspect 14 includes the method of any of aspects 1-13, wherein the configuration further indicates the overlapping of the scheduled uplink communication and the scheduled downlink communication.

Aspect 15 includes the method of any of aspects 1-14, wherein the configuration indicating the overlapping of the scheduled uplink communication and the scheduled downlink communication comprises at least one of a bitmap indicating overlapping slots of the scheduled uplink communication and the scheduled downlink communication; or a periodicity and an offset indicating overlapping slots of the scheduled uplink communication and the scheduled downlink communication.

Aspect 16 includes the method of any of aspects 1-15, wherein the scheduled uplink communication is scheduled over multiple contiguous slots; and the refraining from transmitting the scheduled uplink communication comprises at least one of refraining from transmitting the scheduled uplink communication in all of the multiple contiguous slots; or refraining from transmitting the scheduled uplink communication in one or more of the multiple contiguous slots.

Aspect 17 includes a method of wireless communication performed by a network unit, the method comprising transmitting, to a first user equipment (UE), a configuration indicating scheduled uplink communication resources and interference level measurement resources; receiving, from the first UE, an indicator indicating an interference level associated with a second UE; and performing, for a scheduled uplink communication, at least one of receiving, based on the indicator indicating the interference level associated with the second UE and based on the scheduled uplink communication resources, the scheduled uplink communication; or refraining from monitoring, based on the indicator indicating the interference level associated with the second UE, for the scheduled uplink communication.

Aspect 18 includes the method of aspect 17, wherein the configuration further indicates an interference level threshold.

Aspect 19 includes the method of any of aspects 17-18, further comprising receiving, from the first UE, an indicator indicating the interference level satisfies the interference level threshold, wherein the refraining from monitoring for the scheduled uplink communication comprises refraining from monitoring for the scheduled uplink communication based on the indicator.

Aspect 20 includes the method of any of aspects 17-19, wherein the receiving the scheduled uplink communication comprises receiving the scheduled uplink communication based on the interference level being lower than the interference level threshold.

Aspect 21 includes the method of any of aspects 17-20, wherein the receiving the scheduled uplink communication comprises receiving the scheduled uplink based on the interference level not satisfying the interference level threshold with at least one of a receive beam different from a scheduled receive beam of the scheduled uplink communication; a wide angle receive beam different from a scheduled receive beam of the scheduled uplink communication; or a frequency range less than a scheduled frequency range of the scheduled uplink communication.

Aspect 22 includes the method of any of aspects 17-21 wherein the transmitting the configuration comprises transmitting the configuration via at least one of a radio resource control (RRC) message, a medium access control control element (MAC-CE), or downlink control information (DCI).

Aspect 23 includes the method of any of aspects 17-22, further comprising transmitting, to the first UE, a second configuration indicating second interference level measurement resources, wherein the second interference level measurement resources are based on a proximity of the first UE to the second UE.

Aspect 24 includes the method of any of aspects 17-23, wherein the transmitting the second configuration comprises transmitting the second configuration via at least one of a medium access control control element (MAC-CE) or downlink control information (DCI).

Aspect 25 includes the method of any of aspects 17-24, wherein the receiving the scheduled uplink communication comprises receiving the scheduled uplink communication in at least one of an uplink frequency band that at least partially overlaps a downlink frequency band or an uplink frequency band that does not overlap a downlink frequency band.

Aspect 26 includes the method of any of aspects 17-25, wherein the performing the at least one of the receiving or the refraining from monitoring is further based on at least one of a duplex mode associated with a slot scheduled for the scheduled uplink communication; an overlapping of the slot scheduled for the scheduled uplink communication and the slot scheduled for a scheduled downlink communication from the network unit to the second UE; a priority level associated with the scheduled uplink communication; a frequency separation between a frequency band associated with the scheduled uplink communication and a frequency band associated with a scheduled downlink communication; a repetition associated with the scheduled uplink communication; or a repetition associated with a scheduled downlink communication.

Aspect 27 includes the method of any of aspects 17-26, wherein the configuration further indicates the overlapping of the scheduled uplink communication and the scheduled downlink communication.

Aspect 28 includes the method of any of aspects 17-27, wherein the configuration indicating the overlapping of the scheduled uplink communication and the scheduled downlink communication comprises at least one of a bitmap indicating overlapping slots of the scheduled uplink communication and the scheduled downlink communication; or a periodicity and an offset indicating overlapping slots of the scheduled uplink communication and the scheduled downlink communication.

Aspect 29 includes the method of any of aspects 17-28, wherein the scheduled uplink communication is scheduled over multiple contiguous slots; and the refraining from monitoring for the scheduled uplink communication comprises at least one of refraining from monitoring for the scheduled uplink communication in all of the multiple contiguous slots; or refraining from monitoring for the scheduled uplink communication in one or more of the multiple contiguous slots.

Aspect 30 includes a non-transitory computer-readable medium storing one or more instructions for wireless communication, the one or more instructions comprising one or more instructions that, when executed by one or more processors of a first UE, cause the first UE to perform any one of aspects 1-16.

Aspect 31 includes a non-transitory computer-readable medium storing one or more instructions for wireless communication, the one or more instructions comprising one or more instructions that, when executed by one or more processors of a network unit, cause the network unit to perform any one of aspects 17-29.

Aspect 32 includes a first user equipment (UE) comprising one or more means to perform any one or more of aspects 1-16.

Aspect 33 includes a network unit comprising one or more means to perform any one or more of aspects 17-29.

Aspect 34 includes a first user equipment (UE) comprising a memory; a transceiver; and at least one processor coupled to the memory and the transceiver, wherein the first sidelink UE is configured to perform any one or more of aspects 1-16.

Aspect 35 includes a network unit comprising a memory; a transceiver; and at least one processor coupled to the memory and the transceiver, wherein the network unit is configured to perform any one or more of aspects 17-29.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first user equipment (UE), the method comprising:
 receiving, from a network unit operating in full duplex mode, a configuration indicating interference level measurement resources and an interference level threshold;
 measuring, based on the interference level measurement resources, an interference level associated with a second UE; and
 performing, for a scheduled uplink communication, at least one of:
  transmitting the scheduled uplink communication based on the measured interference level being below the interference level threshold, wherein transmission of the scheduled uplink communication uses at least one of: a transmit power less than a default transmit power of the scheduled uplink communication, a transmit beam different from a scheduled transmit beam of the scheduled uplink communication, or a frequency range less than a scheduled frequency range of the scheduled uplink communication; or
  refraining from transmitting the scheduled uplink communication in response to the measured interference level satisfying the interference level threshold.

2. The method of claim 1, wherein the measuring the interference level associated with the second UE comprises measuring a sounding reference signal (SRS) in the interference level measurement resources.

3. The method of claim 2, wherein the measuring the SRS comprises measuring at least one of:
 a received signal strength indicator (RSSI) associated with the SRS; or
 a reference signal received power (RSRP) associated with the SRS.

4. The method of claim 1, further comprising:
 transmitting, to the network unit, an indicator indicting whether the measured interference level associated with the second UE satisfies the interference level threshold.

5. The method of claim 1, wherein the refraining from transmitting the scheduled uplink communication comprises refraining from transmitting the scheduled uplink communication based on the interference level being greater than the interference level threshold.

6. The method of claim 1, wherein the transmitting the scheduled uplink communication comprises transmitting the scheduled uplink communication based on a configured grant and the interference level being lower than the interference level threshold.

7. The method of claim 1, wherein the performing the at least one of the transmitting or the refraining from transmitting is further based on at least one of:
 a duplex mode associated with a slot scheduled for the scheduled uplink communication;
 an overlapping of the slot scheduled for the scheduled uplink communication and the slot scheduled for a scheduled downlink communication from the network unit to the second UE;
 a priority level associated with the scheduled uplink communication;
 a frequency separation between a frequency band associated with the scheduled uplink communication and a frequency band associated with a scheduled downlink communication;
 a repetition associated with the scheduled uplink communication; or
 a repetition associated with a scheduled downlink communication.

8. The method of claim 1, wherein:
 the scheduled uplink communication is scheduled over multiple slots; and
 the refraining from transmitting the scheduled uplink communication comprises at least one of:
  refraining from transmitting the scheduled uplink communication in all of the multiple slots; or
  refraining from transmitting the scheduled uplink communication in one or more of the multiple slots.

9. A user equipment (UE) comprising:
 a memory;
 a transceiver; and
 at least one processor coupled to the memory and the transceiver, wherein the UE is configured to:

receive, from a network unit operating in full duplex mode, a configuration indicating interference level measurement resources and an interference level threshold;

measure, based on the interference level measurement resources, an interference level associated with a second UE; and perform, for a scheduled uplink communication, at least one of:

transmitting the scheduled uplink communication based on the measured interference level being below the interference level threshold, wherein transmission of the scheduled uplink communication uses at least one of: a transmit power less than a default transmit power of the scheduled uplink communication, a transmit beam different from a scheduled transmit beam of the scheduled uplink communication, or a frequency range less than a scheduled frequency range of the scheduled uplink communication; or refraining, based on the measured interference level associated with the second UE, from transmitting the scheduled uplink communication.

10. The UE of claim 9, wherein the UE is further configured to measure a sounding reference signal (SRS) in the interference level measurement resources.

11. The UE of claim 10, wherein the UE is further configured to measure at least one of:

a received signal strength indicator (RSSI) associated with the SRS; or a reference signal received power (RSRP) associated with the SRS.

12. The UE of claim 10, wherein the UE is further configured to:

transmit, to the network unit, an indicator indicting whether the measured interference level associated with the second UE satisfies the interference level threshold.

13. The UE of claim 10, wherein the UE is further configured to:

refrain from transmitting the scheduled uplink communication based on the interference level being greater than the interference level threshold.

14. The UE of claim 10, wherein the UE is further configured to:

transmit the scheduled uplink communication based on a configured grant and the interference level being lower than the interference level threshold.

15. The UE of claim 9, wherein the UE is further configured to perform the at least one of the transmitting or the refraining from transmitting further based on at least one of:

a duplex mode associated with a slot scheduled for the scheduled uplink communication;

an overlapping of the slot scheduled for the scheduled uplink communication and the slot scheduled for a scheduled downlink communication from the network unit to the second UE;

a priority level associated with the scheduled uplink communication;

a frequency separation between a frequency band associated with the scheduled uplink communication and a frequency band associated with a scheduled downlink communication;

a repetition associated with the scheduled uplink communication; or a repetition associated with a scheduled downlink communication.

16. The UE of claim 9, wherein:

the scheduled uplink communication is scheduled over multiple slots; and the UE is further configured to at least one of:

refrain from transmitting the scheduled uplink communication in all of the multiple slots; or refrain from transmitting the scheduled uplink communication in one or more of the multiple slots.

17. A non-transitory computer-readable medium storing a set of instructions for wireless communication, the set of instructions comprising:

one or more instructions that, when executed by one or more processors of a first user equipment (UE), cause the first UE to:

receive, from a network unit operating in full duplex mode, a configuration indicating interference level measurement resources and an interference level threshold;

measure, based on the interference level measurement resources, an interference level associated with a second UE; and perform, for a scheduled uplink communication, at least one of:

transmit the scheduled uplink communication based on the measured interference level being below the interference level threshold, wherein transmission of the scheduled uplink communication uses at least one of: a transmit power less than a default transmit power of the scheduled uplink communication, a transmit beam different from a scheduled transmit beam of the scheduled uplink communication, or a frequency range less than a scheduled frequency range of the scheduled uplink communication; or refrain from transmitting the scheduled uplink communication in response to the measured interference level satisfying the interference level threshold.

18. The non-transitory computer-readable medium of claim 17, wherein the instructions further cause the first UE to measure a sounding reference signal (SRS) in the interference level measurement resources.

19. The non-transitory computer-readable medium of claim 18, wherein the instructions further cause the first UE to measure at least one of a received signal strength indicator (RSSI) associated with the SRS or a reference signal received power (RSRP) associated with the SRS.

20. The non-transitory computer-readable medium of claim 17, wherein the instructions further cause the first UE to transmit, to the network unit, an indicator indicating whether the measured interference level associated with the second UE satisfies the interference level threshold.

21. The non-transitory computer-readable medium of claim 17, wherein, when the measured interference level associated with the second UE is greater than the interference level threshold, the instructions further cause the first UE to refrain from transmitting the scheduled uplink communication.

22. The non-transitory computer-readable medium of claim 17, wherein, when the interference level is lower than the interference level threshold, the instructions further cause the first UE to transmit the scheduled uplink communication based on a configured grant.

23. The non-transitory computer-readable medium of claim 17, wherein the instructions further cause the first UE to perform at least one of transmitting or refraining from transmitting based on at least one of a duplex mode associated with a slot scheduled for the scheduled uplink communication, an overlapping of the slot scheduled for the scheduled uplink communication and the slot scheduled for a scheduled downlink communication from the network unit to the second UE, a priority level associated with the scheduled uplink communication, a frequency separation between a frequency band associated with the scheduled uplink communication and a frequency band associated with a scheduled downlink communication, a repetition associated with the scheduled uplink communication, or a repetition associated with a scheduled downlink communication.

24. An apparatus for wireless communication, comprising:

means for receiving, from a network unit operating in full duplex mode, a configuration indicating interference level measurement resources and an interference level threshold;

means for measuring, based on the interference level measurement resources, an interference level associated with a user equipment; and means for, for a scheduled uplink communication, at least one of:

transmitting the scheduled uplink communication based on the measured interference level being below the interference level threshold, wherein transmission of the scheduled uplink communication uses at least one of: a transmit power less than a default transmit power of the scheduled uplink communication, a transmit beam different from a scheduled transmit beam of the scheduled uplink communication, or a frequency range less than a scheduled frequency range of the scheduled uplink communication; or refraining from transmitting the scheduled uplink communication in response to the measured interference level satisfying the interference level threshold.

25. The apparatus of claim 24, further comprising means for measuring a sounding reference signal (SRS) in the interference level measurement resources.

26. The apparatus of claim 25, further comprising means for measuring at least one of a received signal strength indicator (RSSI) associated with the SRS or a reference signal received power (RSRP) associated with the SRS.

27. The apparatus of claim 24, wherein, when the measured interference level associated with the user equipment is greater than the interference level threshold, the apparatus further comprises means for refraining from transmitting the scheduled uplink communication.

28. The apparatus of claim 24, wherein, when the interference level is lower than the interference level threshold, the apparatus further comprises means for transmitting the scheduled uplink communication based on a configured grant.

29. The apparatus of claim 24, further comprising means for transmitting, to the network unit, an indicator indicating whether the measured interference level associated with the user equipment satisfies the interference level threshold.

30. The apparatus of claim 24, further comprising means for performing at least one of transmitting or refraining from transmitting based on at least one of a duplex mode associated with a slot scheduled for the scheduled uplink communication, an overlapping of the slot scheduled for the scheduled uplink communication and the slot scheduled for a scheduled downlink communication from the network unit to the user equipment, a priority level associated with the scheduled uplink communication, a frequency separation between a frequency band associated with the scheduled uplink communication and a frequency band associated with a scheduled downlink communication, a repetition associated with the scheduled uplink communication, or a repetition associated with a scheduled downlink communication.

* * * * *